(12) United States Patent
DiTrolio et al.

(10) Patent No.: US 7,396,512 B2
(45) Date of Patent: Jul. 8, 2008

(54) AUTOMATIC PRECISION NON-CONTACT OPEN-LOOP FLUID DISPENSING

(75) Inventors: Nicholas M. DiTrolio, Havertown, PA (US); Eric L. Canfield, Chester Springs, PA (US)

(73) Assignee: Drummond Scientific Company, Broomall, PA (US)

( * ) Notice: Subject to any disclaimer, the term of this patent is extended or adjusted under 35 U.S.C. 154(b) by 896 days.

(21) Appl. No.: 10/700,374

(22) Filed: Nov. 4, 2003

(65) Prior Publication Data

US 2005/0095723 A1 May 5, 2005

(51) Int. Cl.
*B01L 3/02* (2006.01)
(52) U.S. Cl. .................. 422/100; 73/864; 73/863.32; 73/863.83; 73/863.72; 73/864.01; 73/864.11; 73/864.15
(58) Field of Classification Search .............. 422/100; 73/863.32, 863.83, 863.72, 863.86, 864, 73/864.01, 864.11, 864.15
See application file for complete search history.

(56) References Cited

U.S. PATENT DOCUMENTS

| | | | |
|---|---|---|---|
| 3,719,087 A * | 3/1973 | Thiers | 73/864.14 |
| 3,786,683 A | 1/1974 | Berman et al. | |
| 3,834,240 A | 9/1974 | Kenney | |
| 3,938,392 A | 2/1976 | Rodrigues | |
| 3,938,958 A | 2/1976 | Lanier et al. | |
| 3,949,612 A | 4/1976 | Thompson et al. | |
| 3,949,613 A | 4/1976 | Irwin | |
| 3,963,061 A | 6/1976 | Kenney | |
| 3,972,683 A | 8/1976 | Lape | |
| 3,982,438 A | 9/1976 | Byrd | |
| 3,990,312 A | 11/1976 | Koukol | |
| 3,992,947 A | 11/1976 | Thiemann et al. | |
| D242,729 S | 12/1976 | Kenney | |

(Continued)

FOREIGN PATENT DOCUMENTS

WO    WO 2004/062805    7/2004

(Continued)

OTHER PUBLICATIONS

Johnson, Brent, "Trigger Happy: Sleek New Pipette Fillers Duel For Honors As Top Gun," *The Scientist*, 7 pages (Oct. 26, 1998).

(Continued)

*Primary Examiner*—Brian R. Gordon
(74) *Attorney, Agent, or Firm*—Nixon & Vanderhye PC

(57) ABSTRACT

A rugged, all-electronic fluid dispensing system for use with pipettes or in other contexts indirectly measures fluid flow by using a non-linear system model to correlate vacuum existing at the top of a column of suspended fluid. Non-contact operation is provided to eliminate the need for contact-type closed-loop fluid flow sensing and associated potential cross-contamination risks. In one particular exemplary non-limiting illustrative implementation, an electronic controller within a gun-shaped, cordless self-contained pipetter housing dynamically calculates valve opening time based on a non-linear equation. Calibration is used to derive equation constants, and column vacuum pressure before the valve is opened is used as the independent variable to derive a valve opening time that will result in accurate dispensing of a desired programmed fluid quantity. Repetitive automatic dispensing with accuracies greater than 1% are possible within the context of a relatively inexpensive portable pipette or device without the need for mechanically-complex positive displacement arrangements.

20 Claims, 14 Drawing Sheets

U.S. PATENT DOCUMENTS

| | | |
|---|---|---|
| 4,015,942 A | 4/1977 | Coupe |
| 4,016,765 A | 4/1977 | Lee |
| 4,022,059 A | 5/1977 | Schontzler et al. |
| 4,041,995 A | 8/1977 | Columbus |
| 4,046,011 A | 9/1977 | Olsen |
| 4,047,438 A | 9/1977 | Sekine |
| 4,058,146 A | 11/1977 | Citrin |
| 4,058,370 A | 11/1977 | Suovaniemi |
| 4,063,662 A | 12/1977 | Drummond et al. |
| 4,070,156 A | 1/1978 | Moran et al. |
| 4,077,263 A | 3/1978 | Brailsford |
| 4,083,252 A | 4/1978 | Stookey |
| 4,091,677 A | 5/1978 | Oshikubo |
| 4,096,972 A | 6/1978 | Bartels et al. |
| 4,117,728 A | 10/1978 | Johnson |
| 4,119,125 A | 10/1978 | Elkins |
| D250,599 S | 12/1978 | St. Amand |
| 4,133,642 A | 1/1979 | Nosaka et al. |
| 4,140,020 A | 2/1979 | Cook |
| 4,155,490 A | 5/1979 | Glenn |
| 4,158,035 A | 6/1979 | Haase et al. |
| 4,161,508 A | 7/1979 | Janchen |
| 4,162,689 A | 7/1979 | Zdrodowski |
| 4,195,526 A | 4/1980 | Amos et al. |
| 4,198,483 A | 4/1980 | Sogi et al. |
| 4,212,204 A | 7/1980 | St. Amand |
| 4,215,092 A | 7/1980 | Suovaniemi et al. |
| 4,223,558 A | 9/1980 | Schmider et al. |
| 4,224,281 A | 9/1980 | Thieme et al. |
| 4,228,831 A | 10/1980 | Kerns |
| 4,250,755 A | 2/1981 | Kenney |
| 4,257,268 A | 3/1981 | Pepicelli et al. |
| 4,261,205 A | 4/1981 | Oshikubo et al. |
| 4,263,257 A | 4/1981 | Metsala |
| 4,267,723 A | 5/1981 | Mull |
| 4,268,481 A | 5/1981 | Suovaniemi et al. |
| 4,276,048 A | 6/1981 | Leaback |
| 4,276,260 A | 6/1981 | Drbal et al. |
| 4,284,604 A | 8/1981 | Tervamaki |
| 4,285,907 A | 8/1981 | Hugemann et al. |
| 4,286,637 A | 9/1981 | Wilson |
| 4,294,125 A | 10/1981 | Lee |
| 4,296,071 A | 10/1981 | Weiss et al. |
| 4,298,575 A | 11/1981 | Berglund |
| 4,311,667 A | 1/1982 | Gocho |
| 4,325,909 A | 4/1982 | Coulter et al. |
| 4,326,851 A | 4/1982 | Bello et al. |
| 4,332,768 A | 6/1982 | Berglund |
| 4,340,390 A | 7/1982 | Collins et al. |
| 4,341,736 A | 7/1982 | Drbal et al. |
| 4,344,768 A | 8/1982 | Parker et al. |
| 4,347,215 A | 8/1982 | Sisti et al. |
| 4,347,750 A | 9/1982 | Tersteeg et al. |
| 4,351,799 A | 9/1982 | Gross et al. |
| 4,361,253 A | 11/1982 | Flynn et al. |
| 4,369,664 A | 1/1983 | Bunce et al. |
| 4,399,711 A | 8/1983 | Klein |
| 4,399,712 A | 8/1983 | Oshikubo et al. |
| 4,406,170 A | 9/1983 | Kuhn |
| 4,419,903 A | 12/1983 | Jackson |
| 4,429,583 A | 2/1984 | Watanabe et al. |
| RE31,555 E | 4/1984 | Garren et al. |
| 4,444,062 A | 4/1984 | Bennett et al. |
| 4,452,899 A | 6/1984 | Alston |
| 4,457,184 A | 7/1984 | Shiono |
| 4,459,267 A | 7/1984 | Bunce et al. |
| 4,459,864 A | 7/1984 | Cirincione |
| 4,461,328 A | 7/1984 | Kenney |
| 4,468,974 A | 9/1984 | Malinoff |
| 4,469,793 A | 9/1984 | Guigan |
| 4,478,094 A | 10/1984 | Salomaa et al. |
| 4,483,825 A | 11/1984 | Fatches |
| 4,498,510 A | 2/1985 | Minshew, Jr. et al. |
| 4,510,035 A | 4/1985 | Seshimoto |
| 4,511,534 A | 4/1985 | Bennett, Jr. et al. |
| 4,526,046 A | 7/1985 | Oberli |
| 4,527,437 A | 7/1985 | Wells |
| 4,528,158 A | 7/1985 | Gilles et al. |
| 4,528,161 A | 7/1985 | Eckert |
| 4,532,805 A | 8/1985 | Flesher |
| 4,537,231 A | 8/1985 | Hasskamp |
| 4,554,134 A | 11/1985 | Tervamaki et al. |
| 4,563,104 A | 1/1986 | Saint-Amand |
| 4,563,332 A | 1/1986 | Mitchell et al. |
| 4,563,907 A | 1/1986 | Johnson, Jr. et al. |
| 4,565,100 A | 1/1986 | Malinoff |
| 4,567,780 A | 2/1986 | Oppenlander et al. |
| 4,570,495 A | 2/1986 | Terada |
| 4,574,850 A | 3/1986 | Davis |
| 4,580,703 A | 4/1986 | Anderson, Jr. |
| 4,586,546 A | 5/1986 | Mezei et al. |
| 4,590,165 A | 5/1986 | Gilles et al. |
| 4,593,728 A | 6/1986 | Whitehead et al. |
| 4,596,780 A | 6/1986 | Castaneda |
| 4,599,220 A | 7/1986 | Yonkers et al. |
| 4,621,667 A | 11/1986 | Eberle |
| 4,623,008 A | 11/1986 | Shibata et al. |
| 4,624,147 A | 11/1986 | Kenney |
| 4,624,928 A | 11/1986 | Qureshi |
| 4,630,753 A | 12/1986 | Anscherlik |
| 4,644,807 A | 2/1987 | Mar |
| 4,656,007 A | 4/1987 | Douchy et al. |
| 4,660,607 A | 4/1987 | Griffith et al. |
| 4,670,219 A | 6/1987 | Nelson et al. |
| 4,671,123 A | 6/1987 | Magnussen, Jr. et al. |
| 4,675,301 A | 6/1987 | Charneski et al. |
| 4,679,446 A | 7/1987 | Sheehan et al. |
| 4,683,911 A | 8/1987 | Mayes |
| 4,699,884 A | 10/1987 | Noss et al. |
| 4,715,413 A | 12/1987 | Backlund et al. |
| 4,726,932 A | 2/1988 | Feier et al. |
| 4,728,501 A | 3/1988 | Atake |
| 4,734,261 A | 3/1988 | Koizumi et al. |
| 4,737,344 A | 4/1988 | Koizumi et al. |
| 4,750,373 A | 6/1988 | Shapiro |
| 4,757,437 A | 7/1988 | Nishimura |
| 4,760,939 A | 8/1988 | Ball et al. |
| 4,761,268 A | 8/1988 | Andersen et al. |
| 4,763,535 A | 8/1988 | Rainin et al. |
| 4,774,057 A | 9/1988 | Uffenheimer et al. |
| 4,779,467 A | 10/1988 | Rainin et al. |
| 4,779,768 A | 10/1988 | St. Amand |
| 4,780,833 A | 10/1988 | Atake |
| 4,784,834 A | 11/1988 | Hirschmann |
| 4,785,677 A | 11/1988 | Higo |
| 4,788,150 A | 11/1988 | Nelson et al. |
| 4,801,429 A | 1/1989 | Torfs et al. |
| 4,801,434 A | 1/1989 | Kido et al. |
| 4,808,381 A | 2/1989 | McGregor et al. |
| 4,810,659 A | 3/1989 | Higo et al. |
| 4,815,632 A | 3/1989 | Ball et al. |
| 4,818,706 A | 4/1989 | Starr |
| 4,821,586 A | 4/1989 | Scordato et al. |
| 4,824,642 A | 4/1989 | Lyman et al. |
| 4,830,832 A | 5/1989 | Arpagaus et al. |
| 4,844,872 A | 7/1989 | Geiselman et al. |
| 4,852,620 A | 8/1989 | Jakubowicz et al. |
| 4,863,695 A | 9/1989 | Fullemann |
| 4,868,129 A | 9/1989 | Gibbons et al. |
| 4,873,059 A | 10/1989 | Kido et al. |
| 4,874,114 A | 10/1989 | Guigan |
| 4,877,585 A | 10/1989 | Perlman |
| 4,896,270 A | 1/1990 | Kalmakis et al. |
| 4,905,526 A | 3/1990 | Magnussen, Jr. et al. |

| | | | | | |
|---|---|---|---|---|---|
| 4,906,432 A | 3/1990 | Geiselman | 5,272,926 A | 12/1993 | Wilkins |
| 4,909,991 A | 3/1990 | Oshikubo | 5,273,717 A | 12/1993 | Marvin |
| 4,926,701 A | 5/1990 | Tompkins | 5,275,951 A | 1/1994 | Chow et al. |
| 4,929,428 A | 5/1990 | Tezuka | 5,279,791 A | 1/1994 | Aldrich et al. |
| 4,944,922 A | 7/1990 | Hayashi | 5,294,405 A | 3/1994 | Kenney |
| 4,961,906 A | 10/1990 | Andersen et al. | 5,304,347 A | 4/1994 | Mann et al. |
| 4,965,050 A | 10/1990 | Jessop | 5,306,510 A | 4/1994 | Meltzer |
| 4,971,763 A | 11/1990 | Columbus | 5,308,583 A | 5/1994 | Sanuki |
| 4,976,925 A | 12/1990 | Porcher et al. | 5,309,959 A | 5/1994 | Shaw et al. |
| 4,988,481 A | 1/1991 | Jarvimaki et al. | 5,312,757 A | 5/1994 | Matsuyama et al. |
| 4,999,164 A | 3/1991 | Puchinger et al. | 5,315,886 A | 5/1994 | Guigan |
| 5,000,921 A | 3/1991 | Hanaway et al. | 5,318,359 A | 6/1994 | Wakatake |
| 5,002,737 A | 3/1991 | Tervamaki | 5,320,810 A | 6/1994 | Al-Mahareeq et al. |
| 5,013,529 A | 5/1991 | Itoh | 5,322,192 A | 6/1994 | Godolphin et al. |
| 5,021,217 A | 6/1991 | Oshikubo | 5,324,480 A | 6/1994 | Shumate et al. |
| 5,024,109 A | 6/1991 | Romero et al. | 5,330,717 A | 7/1994 | Berteloot et al. |
| 5,035,150 A | 7/1991 | Tompkins | 5,330,721 A | 7/1994 | Tervamaki |
| 5,045,286 A | 9/1991 | Kitajima et al. | 5,334,353 A | 8/1994 | Blattner |
| 5,046,539 A | 9/1991 | MacLeish et al. | 5,342,190 A | 8/1994 | Salter |
| 5,053,100 A | 10/1991 | Hayes et al. | 5,343,909 A | 9/1994 | Goodman |
| 5,055,263 A | 10/1991 | Meltzer | 5,348,606 A | 9/1994 | Hanaway et al. |
| 5,057,281 A | 10/1991 | Torti et al. | 5,348,705 A | 9/1994 | Koreyasu et al. |
| 5,059,398 A | 10/1991 | Kenney | 5,354,538 A | 10/1994 | Bunce et al. |
| 5,061,449 A | 10/1991 | Torti et al. | 5,363,885 A | 11/1994 | McConnell et al. |
| 5,061,639 A | 10/1991 | Lung et al. | 5,364,596 A | 11/1994 | Magnussen, Jr. et al. |
| 5,062,547 A | 11/1991 | Zahner et al. | 5,364,598 A | 11/1994 | Oxley |
| 5,063,025 A | 11/1991 | Ito | 5,365,798 A | 11/1994 | Kressirer |
| 5,063,790 A | 11/1991 | Freeman et al. | 5,366,904 A | 11/1994 | Qureshi et al. |
| 5,064,541 A | 11/1991 | Jeng et al. | 5,370,842 A | 12/1994 | Miyazaki et al. |
| 5,073,347 A | 12/1991 | Garren et al. | 5,372,782 A | 12/1994 | Karkantis et al. |
| 5,078,970 A | 1/1992 | Teodorescu et al. | 5,384,093 A | 1/1995 | Ootani et al. |
| 5,081,872 A | 1/1992 | Greter | 5,389,341 A | 2/1995 | Tuunanen et al. |
| 5,084,241 A | 1/1992 | Parker | 5,405,585 A | 4/1995 | Coassin |
| 5,085,832 A | 2/1992 | Shaw et al. | 5,406,856 A | 4/1995 | Kuhn |
| 5,090,255 A | 2/1992 | Kenney | 5,439,649 A | 8/1995 | Tseung et al. |
| 5,094,961 A | 3/1992 | del Valle et al. | 5,440,940 A | 8/1995 | Wilkins |
| 5,096,670 A * | 3/1992 | Harris et al. ............... 422/65 | 5,443,792 A | 8/1995 | Buhler |
| 5,104,624 A | 4/1992 | Labriola | 5,445,797 A | 8/1995 | Flesher |
| 5,104,625 A | 4/1992 | Kenney | 5,447,691 A | 9/1995 | Sanuki |
| 5,111,703 A | 5/1992 | Allen | 5,449,494 A | 9/1995 | Seeney |
| 5,114,679 A | 5/1992 | Reifler et al. | 5,452,619 A | 9/1995 | Kawanabe et al. |
| 5,118,474 A | 6/1992 | Rogalsky | 5,453,246 A | 9/1995 | Nakayama et al. |
| 5,121,642 A | 6/1992 | Davidowicz et al. | 5,454,268 A | 10/1995 | Kim |
| 5,123,438 A | 6/1992 | Henderson | 5,455,008 A | 10/1995 | Earley et al. |
| 5,125,278 A | 6/1992 | Foldenauer | 5,456,879 A | 10/1995 | Suovaniemi |
| 5,130,254 A | 7/1992 | Collier et al. | 5,456,880 A | 10/1995 | Miura |
| 5,133,218 A | 7/1992 | Uffenhiemer et al. | 5,460,782 A | 10/1995 | Coleman et al. |
| 5,143,849 A | 9/1992 | Barry et al. | 5,463,895 A | 11/1995 | Brentz |
| 5,151,184 A | 9/1992 | Ferkany | 5,465,629 A | 11/1995 | Waylett, Jr. |
| 5,156,811 A | 10/1992 | White | 5,474,744 A | 12/1995 | Lerch |
| 5,158,748 A | 10/1992 | Obi et al. | 5,479,969 A | 1/1996 | Hardie et al. |
| 5,171,537 A | 12/1992 | Wainwright et al. | 5,486,478 A | 1/1996 | Kuriyama |
| 5,173,265 A | 12/1992 | Golias et al. | 5,509,318 A | 4/1996 | Gomes |
| 5,173,266 A | 12/1992 | Kenney | 5,510,083 A | 4/1996 | Sack et al. |
| 5,183,765 A | 2/1993 | Qureshi et al. | 5,518,686 A | 5/1996 | Masterson et al. |
| 5,191,801 A | 3/1993 | Allen et al. | 5,525,298 A | 6/1996 | Anami |
| 5,192,511 A | 3/1993 | Roach | 5,525,302 A | 6/1996 | Astle |
| 5,195,657 A | 3/1993 | Wells | 5,525,515 A | 6/1996 | Blattner |
| 5,198,193 A | 3/1993 | Bunce et al. | 5,531,131 A | 7/1996 | Sabloewski |
| 5,200,151 A | 4/1993 | Long | 5,537,880 A | 7/1996 | Takeda et al. |
| 5,204,268 A | 4/1993 | Matsumoto | 5,540,888 A | 7/1996 | Bunce et al. |
| 5,214,968 A | 6/1993 | Kenney | 5,540,889 A | 7/1996 | Gordon et al. |
| 5,215,131 A | 6/1993 | Poy | 5,544,535 A | 8/1996 | Thomas |
| 5,223,225 A | 6/1993 | Gautsch | 5,550,059 A | 8/1996 | Boger et al. |
| 5,232,664 A | 8/1993 | Krawzak et al. | 5,551,487 A | 9/1996 | Gordon et al. |
| 5,232,669 A | 8/1993 | Pardinas | 5,558,838 A | 9/1996 | Uffenheimer |
| 5,238,654 A | 8/1993 | Nohl et al. | 5,571,480 A | 11/1996 | Baccanti et al. |
| 5,248,480 A | 9/1993 | Greenfield et al. | 5,573,729 A | 11/1996 | Belgardt et al. |
| 5,249,711 A | 10/1993 | Filbert, Jr. | 5,578,268 A | 11/1996 | Champseix et al. |
| 5,259,956 A | 11/1993 | Mercer et al. | 5,582,798 A | 12/1996 | Meltzer |
| 5,260,030 A | 11/1993 | DeVaughn | 5,585,069 A | 12/1996 | Zanzucchi et al. |
| 5,262,049 A | 11/1993 | Ferkany | 5,591,408 A | 1/1997 | Belgardt et al. |
| 5,270,219 A | 12/1993 | DeCastro et al. | 5,593,893 A | 1/1997 | Kobashi et al. |

| | | | | | | |
|---|---|---|---|---|---|---|
| 5,597,733 | A | 1/1997 | Bell et al. | 5,925,834 A | 7/1999 | Sgourakes |
| 5,599,500 | A | 2/1997 | Jones | 5,927,547 A | 7/1999 | Papen et al. |
| 5,616,871 | A | 4/1997 | Kenney | 5,932,987 A | 8/1999 | McLoughlin |
| 5,620,660 | A | 4/1997 | Belgardt et al. | 5,939,330 A | 8/1999 | Peterson |
| 5,620,661 | A | 4/1997 | Schurbrock | 5,942,441 A | 8/1999 | Nylen |
| 5,624,059 | A | 4/1997 | Lo | 5,945,611 A | 8/1999 | Welker |
| 5,624,849 | A | 4/1997 | Thomas et al. | 5,947,167 A | 9/1999 | Bogen et al. |
| 5,629,201 | A | 5/1997 | Nugteren et al. | 5,948,359 A | 9/1999 | Kalra et al. |
| 5,629,209 | A | 5/1997 | Braun, Sr. et al. | 5,951,950 A | 9/1999 | Fukuoka et al. |
| 5,639,425 | A | 6/1997 | Komiyama et al. | 5,957,167 A | 9/1999 | Feygin |
| 5,639,426 | A | 6/1997 | Kerr et al. | 5,958,342 A | 9/1999 | Gamble et al. |
| 5,639,665 | A | 6/1997 | Arai et al. | 5,958,343 A | 9/1999 | Astle |
| 5,645,114 | A | 7/1997 | Bogen et al. | 5,958,344 A | 9/1999 | Levine et al. |
| 5,645,800 | A | 7/1997 | Masterson et al. | 5,961,927 A | 10/1999 | Isaacs et al. |
| 5,654,200 | A | 8/1997 | Copeland et al. | 5,962,329 A | 10/1999 | Ershov et al. |
| 5,665,601 | A | 9/1997 | Kilmer | 5,965,447 A | 10/1999 | Sekiyama et al. |
| 5,672,320 | A | 9/1997 | Ritter | 5,976,468 A | 11/1999 | Godec et al. |
| 5,681,437 | A | 10/1997 | Black et al. | 5,980,830 A | 11/1999 | Savage et al. |
| 5,683,915 | A | 11/1997 | Black et al. | 5,983,733 A | 11/1999 | Strandberg et al. |
| 5,700,695 | A | 12/1997 | Yassinzadeh et al. | 5,988,236 A | 11/1999 | Fawcett |
| 5,705,750 | A | 1/1998 | Mizukami et al. | 5,993,744 A | 11/1999 | Rao et al. |
| 5,736,105 | A | 4/1998 | Astle | 5,997,819 A | 12/1999 | Mougin et al. |
| 5,744,099 | A | 4/1998 | Chase et al. | 5,998,214 A | 12/1999 | Guirguis |
| 5,747,350 | A | 5/1998 | Sattler | 5,998,218 A | 12/1999 | Conley et al. |
| 5,747,709 | A | 5/1998 | Oshikubo | 6,001,309 A | 12/1999 | Gamble et al. |
| 5,750,881 | A | 5/1998 | Dorenkott et al. | 6,003,388 A | 12/1999 | Oeftering |
| 5,753,514 | A | 5/1998 | Karlsson et al. | 6,006,800 A | 12/1999 | Nakano |
| 5,756,050 | A | 5/1998 | Ershow et al. | 6,007,776 A | 12/1999 | Matsumoto |
| 5,759,847 | A | 6/1998 | Eden et al. | 6,021,680 A | 2/2000 | Inagaki et al. |
| 5,763,278 | A | 6/1998 | Sickinger et al. | 6,042,709 A | 3/2000 | Parce et al. |
| 5,770,151 | A | 6/1998 | Roach et al. | 6,045,757 A | 4/2000 | Moriarty et al. |
| 5,770,159 | A | 6/1998 | D'Autry | 6,045,759 A | 4/2000 | Ford et al. |
| 5,770,160 | A | 6/1998 | Smith et al. | 6,048,498 A | 4/2000 | Kennedy |
| 5,772,966 | A | 6/1998 | Maracas et al. | 6,051,190 A | 4/2000 | Birch et al. |
| 5,773,298 | A | 6/1998 | Lynggaard et al. | 6,054,325 A | 4/2000 | Kedar et al. |
| 5,775,546 | A | 7/1998 | Buehler | 6,060,024 A | 5/2000 | Hutchins et al. |
| 5,783,155 | A | 7/1998 | Greenler et al. | 6,060,320 A | 5/2000 | Dorenkott et al. |
| 5,783,446 | A | 7/1998 | Saul et al. | 6,063,339 A | 5/2000 | Tisone et al. |
| 5,783,451 | A | 7/1998 | Van Praet | 6,063,634 A | 5/2000 | Chomka et al. |
| 5,785,926 | A | 7/1998 | Seubert et al. | 6,063,635 A | 5/2000 | Ohta et al. |
| 5,792,424 | A | 8/1998 | Homberg et al. | 6,066,297 A | 5/2000 | Torti et al. |
| 5,801,062 | A | 9/1998 | Sarstedt et al. | 6,073,498 A | 6/2000 | Taylor et al. |
| 5,804,144 | A | 9/1998 | Tervamaki | 6,074,611 A | 6/2000 | Flesher |
| 5,811,306 | A | 9/1998 | Komatsu | 6,079,283 A | 6/2000 | Papen et al. |
| 5,817,955 | A | 10/1998 | Gherson et al. | 6,083,762 A | 7/2000 | Papen et al. |
| 5,827,744 | A | 10/1998 | Fose et al. | 6,085,944 A | 7/2000 | Lang et al. |
| 5,834,314 | A | 11/1998 | Gates et al. | 6,090,348 A | 7/2000 | Steele et al. |
| 5,836,360 | A | 11/1998 | Gavin et al. | 6,100,094 A | 8/2000 | Tajima |
| 5,843,378 | A | 12/1998 | El-Hage et al. | 6,105,636 A | 8/2000 | Scatizzi et al. |
| 5,846,492 | A | 12/1998 | Jacobs et al. | 6,110,427 A | 8/2000 | Uffenheimer |
| 5,849,248 | A | 12/1998 | Homberg | 6,117,396 A | 9/2000 | Demers |
| 5,849,598 | A | 12/1998 | Wilson et al. | 6,121,049 A | 9/2000 | Dorenkott et al. |
| 5,851,491 | A | 12/1998 | Moulton | 6,123,905 A | 9/2000 | Torti et al. |
| 5,853,670 | A | 12/1998 | Bunce | 6,135,325 A | 10/2000 | Fessel et al. |
| 5,855,851 | A | 1/1999 | Matsubara et al. | 6,146,594 A | 11/2000 | De Graaff et al. |
| 5,861,317 | A | 1/1999 | Tanihata | 6,148,666 A | 11/2000 | Roesicke |
| 5,871,699 | A | 2/1999 | Ruggeri | 6,149,815 A | 11/2000 | Sauter |
| 5,874,296 | A | 2/1999 | Kang | 6,150,173 A | 11/2000 | Schubert |
| 5,876,675 | A | 3/1999 | Kennedy | 6,152,194 A | 11/2000 | Tenkanen et al. |
| 5,879,627 | A | 3/1999 | Tanihata | 6,158,269 A | 12/2000 | Dorenkott et al. |
| 5,879,632 | A | 3/1999 | Demers | 6,158,292 A | 12/2000 | Gilson et al. |
| 5,879,633 | A | 3/1999 | Tervamaki et al. | 6,168,761 B1 | 1/2001 | Kelly et al. |
| 5,879,944 | A | 3/1999 | Komatsu | 6,171,553 B1 | 1/2001 | Petrek |
| 5,895,631 | A | 4/1999 | Tajima | 6,199,605 B1 | 3/2001 | Inaba et al. |
| 5,895,761 | A | 4/1999 | Jacobs | 6,200,814 B1 | 3/2001 | Malmqvist et al. |
| 5,895,762 | A | 4/1999 | Greenfield et al. | 6,203,759 B1 | 3/2001 | Pelc et al. |
| 5,897,034 | A | 4/1999 | Sewell | 6,218,193 B1 | 4/2001 | Kraft et al. |
| 5,897,837 | A | 4/1999 | Mizuno | 6,232,129 B1 | 5/2001 | Wiktor |
| 5,906,795 | A | 5/1999 | Nakashima et al. | 6,234,033 B1 | 5/2001 | Eipl |
| 5,915,282 | A | 6/1999 | Merriam et al. | 6,235,175 B1 | 5/2001 | Dubrow et al. |
| 5,916,524 | A | 6/1999 | Tisone | 6,235,244 B1 | 5/2001 | Allen et al. |
| 5,919,356 | A | 7/1999 | Hood | 6,238,626 B1 | 5/2001 | Higuchi et al. |
| 5,919,706 | A | 7/1999 | Tajima | 6,241,950 B1 | 6/2001 | Veelenturf et al. |

| | | |
|---|---|---|
| 6,244,119 B1 | 6/2001 | Theran |
| 6,245,297 B1 | 6/2001 | Kowallis |
| 6,248,295 B1 | 6/2001 | Petrek |
| 6,250,130 B1 | 6/2001 | Howard et al. |
| 6,251,343 B1 | 6/2001 | Dubrow et al. |
| 6,253,628 B1 | 7/2001 | Steele et al. |
| 6,254,832 B1 | 7/2001 | Rainin et al. |
| 6,258,324 B1 | 7/2001 | Yiu |
| 6,267,927 B1 | 7/2001 | Pomar Longedo et al. |
| 6,268,219 B1 | 7/2001 | Mcbride et al. |
| 6,269,846 B1 | 8/2001 | Overbeck et al. |
| 6,271,043 B1 | 8/2001 | Godec et al. |
| 6,280,689 B1 | 8/2001 | Stevens |
| 6,284,113 B1 | 9/2001 | Bjornson et al. |
| 6,287,520 B1 | 9/2001 | Parce et al. |
| 6,296,811 B1 | 10/2001 | Sasaki |
| 6,299,841 B1 | 10/2001 | Rainin et al. |
| 6,308,751 B1 | 10/2001 | Fitzgerald et al. |
| 6,319,718 B1 | 11/2001 | Matsubara et al. |
| 6,322,752 B1 | 11/2001 | Siddiqui et al. |
| 6,325,114 B1 | 12/2001 | Bevirt et al. |
| 6,326,212 B1 | 12/2001 | Aoki |
| 6,335,204 B1 | 1/2002 | Kuo |
| 6,342,184 B1 | 1/2002 | Bevan et al. |
| 6,350,616 B1 | 2/2002 | Fukuoka et al. |
| 6,352,673 B1 | 3/2002 | Rainin et al. |
| 6,355,487 B2 | 3/2002 | Kowallis |
| 6,358,471 B1 | 3/2002 | Ishihara |
| 6,365,110 B1 | 4/2002 | Rainin et al. |
| 6,372,185 B1 | 4/2002 | Shumate et al. |
| 6,379,624 B1 | 4/2002 | Lange |
| 6,379,974 B1 | 4/2002 | Parce et al. |
| 6,387,330 B1 | 5/2002 | Bova et al. |
| 6,394,759 B1 | 5/2002 | Parce |
| 6,395,231 B1 | 5/2002 | Kraemer et al. |
| 6,395,232 B1 | 5/2002 | McBride |
| 6,395,559 B1 | 5/2002 | Swenson |
| RE37,734 E | 6/2002 | Buehler |
| 6,399,024 B1 | 6/2002 | Bevirt et al. |
| 6,399,395 B1 | 6/2002 | Zengerle et al. |
| 6,399,396 B1 | 6/2002 | Bass |
| 6,405,609 B1 | 6/2002 | Richards et al. |
| 6,406,605 B1 | 6/2002 | Moles |
| 6,413,475 B2 | 7/2002 | Ishizawa et al. |
| 6,416,642 B1 | 7/2002 | Alajoki et al. |
| 6,416,713 B1 | 7/2002 | Ford et al. |
| 6,420,186 B1 | 7/2002 | Berger et al. |
| 6,428,668 B1 | 8/2002 | Ansorge et al. |
| 6,428,750 B1 | 8/2002 | Rainin et al. |
| 6,431,015 B1 | 8/2002 | Hodac et al. |
| 6,432,365 B1 | 8/2002 | Levin et al. |
| 6,432,719 B1 | 8/2002 | Vann et al. |
| 6,440,370 B1 | 8/2002 | Blum et al. |
| 6,444,173 B1 | 9/2002 | Sjursen et al. |
| 6,447,727 B1 | 9/2002 | Parce et al. |
| 6,448,090 B1 | 9/2002 | McBride |
| 6,451,263 B1 | 9/2002 | Sarrine |
| 6,454,924 B2 | 9/2002 | Jedrzejewski et al. |
| 6,455,006 B1 | 9/2002 | Mukai |
| 6,455,325 B1 | 9/2002 | Tajima |
| 6,457,612 B1 | 10/2002 | Zhang et al. |
| 6,458,325 B1 | 10/2002 | Roscher et al. |
| 6,463,969 B1 | 10/2002 | Devlin, Sr. |
| 6,465,257 B1 | 10/2002 | Parce et al. |
| 6,472,217 B1 | 10/2002 | Richards et al. |
| 6,474,180 B2 | 11/2002 | Bigus |
| 6,475,440 B1 | 11/2002 | Bochkariov |
| 6,482,362 B1 | 11/2002 | Smith |
| 6,482,364 B2 | 11/2002 | Parce et al. |
| 6,485,690 B1 | 11/2002 | Pfost et al. |
| 6,488,894 B1 | 12/2002 | Miethe et al. |
| 6,488,895 B1 | 12/2002 | Kennedy |
| 6,488,897 B2 | 12/2002 | Dubrow et al. |
| 6,489,171 B1 | 12/2002 | Aghassi et al. |
| 6,492,184 B1 | 12/2002 | Petro et al. |
| 6,495,104 B1 | 12/2002 | Unno et al. |
| 6,495,106 B1 | 12/2002 | Kalra et al. |
| 6,495,369 B1 | 12/2002 | Kercso et al. |
| 6,499,365 B1 | 12/2002 | Baumgartner |
| 6,500,323 B1 | 12/2002 | Chow et al. |
| 6,502,470 B1 | 1/2003 | Taylor et al. |
| 6,503,454 B1 | 1/2003 | Hadimioglu et al. |
| 6,509,193 B1 | 1/2003 | Tajima |
| 6,510,736 B1 | 1/2003 | Van Ee |
| 6,514,466 B2 | 2/2003 | Labriola et al. |
| 6,521,187 B1 | 2/2003 | Papen |
| 6,521,188 B1 | 2/2003 | Webster |
| 6,524,456 B1 | 2/2003 | Ramsey et al. |
| 6,524,531 B1 | 2/2003 | Feygin |
| 6,537,505 B1 * | 3/2003 | LaBudde et al. ............ 422/103 |
| RE38,281 E * | 10/2003 | Tisone ........................ 422/100 |
| 6,997,068 B2 * | 2/2006 | DiTrolio .................. 73/864.14 |
| 7,160,511 B2 * | 1/2007 | Takahashi et al. ........... 422/100 |
| 7,169,616 B2 | 1/2007 | Johnson et al. |
| 7,294,609 B2 * | 11/2007 | Saito et al. .................. 510/138 |
| 2001/0016177 A1 * | 8/2001 | Pelc et al. ................... 422/100 |
| 2002/0159919 A1 * | 10/2002 | Churchill et al. ............ 422/100 |
| 2002/0168297 A1 * | 11/2002 | Shvets et al. ................ 422/100 |
| 2002/0177237 A1 * | 11/2002 | Shvets et al. ................ 436/180 |
| 2003/0170903 A1 | 9/2003 | Johnson et al. |
| 2003/0215957 A1 * | 11/2003 | Lemmo et al. .............. 436/180 |
| 2004/0072365 A1 * | 4/2004 | Rose et al. .................. 436/180 |
| 2004/0074133 A1 * | 4/2004 | DiTrolio .................. 73/864.15 |
| 2004/0101445 A1 * | 5/2004 | Shvets et al. ................ 422/100 |
| 2005/0244303 A1 * | 11/2005 | Ingenhoven et al. ........ 422/100 |
| 2006/0123930 A1 * | 6/2006 | Czernecki et al. ........ 73/864.15 |

OTHER PUBLICATIONS

Miller, K., "The Indispensable Dispenser: The Micropipetter," *The Scientist* 11[22]: 16 (Nov. 10, 1997).

Miller, K., "Over and Over: LabConsumer Tests Nine Repetitive Pipetters," *The Scientist* 12[9]: 16 (Apr. 27, 1998).

Brush, M., "Automated Liquid Handlers Advance," *The Scientist* 16[3]:38 (Feb. 4, 2002).

Web Site Information: www.biohit.com, Liquid Handling, Biohit Proline Electronic Pipettors, Electronic Pipettors, eLine Electronic Pipettors, Specifications, Pipetting Controllers, Proline XL, Specifications, Midi Plus, Specifications.

"A buyer's guide to the systems approach to liquid handling," International Biotechnology Laboratory (Oct. 2000).

Kolari, et al., "The effect of filters on aseptic pipetting lifetime of mechanical and electronic pipettors and carryover during pipetting," University of Helsinki, Dept. of Applied Chemistry and Microbiology, Helsinki, Finland.

"The Safety Net," International Biotechnology Laboratory (Aug. 1999).

Liquid Handling Application Notes: "Choosing a pipetting technique affects the results of your analysis," European Clinical Laboratory (Oct. 1996).

Liquid Handling Application Notes: Mannonen, S., et al., "Accredited calibration and future demands for pipettors,:" International Biotechnology Laboratory (Apr. 2000).

Liquid Handling Application Notes: "Factors influencing pipetting performance: The benefits of an electronic pipettor," International Biotechnology Laboratory (Aug. 1997).

Liquid Handling Application Notes: "Improving ergonomy in pipetting prevents work-related upper limb disorders," International Biotechnology Laboratory (Sep. 1997).

Liquid Handling Application Notes: Mannonen, S., et al., "Major sources of error of air displacement pipettors," International Labmate (Apr. 2000).

Liquid Handling Application Notes: "Optimizing your pipetting performance," International Biotechnology Laboratory (Jun. 1996).

Liquid Handling Application Notes: "Reducing sources of error in pipetting," European BioPharmaceutical Review (Sep. 1997).

Liquid Handling Application Notes: Mannonen, S. et al., "Safety in pipetting," International Labmate (Feb. 2000).

Liquid Handling Application Notes: Mannonen, S., "The design of pipettors can prevent Pipetting Related Upper Limb Disorders (PRULD)," International Biotechnology Laboratory (Aug. 1998).

Liquid Handling Application Notes: Hodgson, E., Work related upper limb disorders and the laboratory, University of Oxford, UK.

Liquid Handling Application Notes: Ylatupa, S., "Pipetting performance. The critical factor for reliable analysis," WDETMT Aug. 1997.

Web Site Information: www.belart.com, Bel-Art The Scienceware Company, Product Catalog—Pipetting, Max Memory Pipettor, Mopet Portable Pipettors, Accropet Pipettors.

Web Site Information, www.bd.com, Becton Dickinson and Company, Product Information, Fluid Handling, BD Falcon Pipets, BD Falcon Pipetters, BD Falcon Express Pipet-Aid, Bench-Top Pipet-Aid.

Web Site Information: www.drummondsci.com, Drummond Scientific Company, Portable Pipet-Aid XP, Portable Pipet-Aid, Pipet-Aid Operation & Service, Nanoject II/Auto Nanoliter Injector, Pipet-Aid Hood Mate, Pipet-Aid, Tissue Culture Nosepiece, Pipet-Aid Dual Pump Filtration Unit, Positive Displacement Digital Microdispensers, Dialamatic Microdispensers, Fixed Volume Microdispensers, Sequencing Pipet, Nanoject II Auto-Nanoliter Injector, Oocyte Microinjection Pipet, Nanoject II Support Accessories, PCR Pipets, Pipet-Aid Pipet forms, Calibrated Micropipets, "Sample delivery, sample retrieval, sample transfer, sample inoculation . . . ".

BD Falcon Pipets and Pipet-Aids, Accuracy at Your Fingertips, BD Biosciences.

Communication received in connection with corresponding EPO application (Sep. 26, 2006).

U.S. Appl. No. 60/351,858 of Johnson et al., entitled "Methods for High-Performance, Low-Volume Dispensing," filed Jan. 25, 2002.

* cited by examiner

AUTOMATIC PRECISION NON-CONTACT OPEN-LOOP FLUID DISPENSING

FIELD

The technology herein relates to fluid dispensing, and more particularly to dispensing fluid from a narrow tube or pipette. Still more particularly, the technology herein relates to non-contact, open-loop automatic dispensing of precise quantities (aliquots) of fluid in the context of a relatively inexpensive, portable handheld gun or other shaped pipetter.

BACKGROUND AND SUMMARY

Life science research has developed into an extremely important area of modern scientific inquiry. Such research is used for example to discover new drugs, to investigate and sequence DNA and other genetic material, and to culture tissues for disease diagnosis to name a few of many areas of concentration.

Laboratory personnel in such laboratory environments are often required to accurately and safely handle and dispense relative small quantities of fluids. For example, a lab technician may prepare an aqueous (water-based) solution of cell nutrient that must be distributed in accurate quantities among a relatively large number of different containers (e.g., small culture tubes, test tubes, microcentifuge tubes, etc.). Often, the technician is faced with a need to dispense precise amounts of such a prepared solution into a large number of containers in multiple trays. See FIG. 1. To provide accurate results, the liquid must be dispensed in relatively accurate and consistent amounts (e.g., better than 5% accuracy).

One common way of dispensing relatively small quantities of liquid is to use a narrow glass or plastic tube called a pipette. Most of us have, at one time or another, experimented with dispensing liquid using a drinking straw. Think of a drinking straw inserted into a glass of liquid so the liquid partially fills the straw. If you seal the uppermost open end of the drinking straw with your finger or thumb, you will be able to remove the drinking straw from the glass of liquid while still retaining the liquid within the straw. The liquid column remains in the straw because a vacuum is created at the top of the liquid column due to the force of gravity pulling the liquid down toward the bottom of the straw. The outside atmospheric pressure presses against the liquid at the open bottom end of the straw to maintain the liquid within the straw. When you release your finger or thumb to open up the drinking straw's top end, the vacuum is filled by atmospheric pressure rushing in to the top end of the straw and the liquid immediately runs out of the straw's bottom end.

Of course, laboratory researchers generally do not use drinking straws to handle and dispense liquids, but they use something quite similar in principle—a narrow disposable glass or plastic tube pipette. Such pipettes come in various standard sizes such as 5 ml, 10 ml, 20 ml, 50 ml, etc. Typically, the pipette has graduations so that the laboratory researcher can read the level of liquid in the tube as it is being dispensed.

Several decades ago, it was common for laboratory researchers to apply mouth suction to the top end of the pipette to suck or "aspirate" a column of liquid into the tube—thus allowing the level of liquid in the pipette to rise above the liquid level in container from which it was being drawn. However, this was relatively time consuming and could be dangerous if the fluids being dispensed were hazardous to health. In addition, mouth suction techniques were not conducive to a sterile environment or the exacting procedures required for genome sequencing and tissue culturing. Accordingly, there came a time several decades ago when various companies began developing "pipetter" handheld devices that accepted common disposable or non-disposable pipettes and which would supply powered suction and positive pressure to the open uppermost end of the pipette to draw up and release liquids. A leader in this development effort was Drummond Scientific Co. of Broomall Pa.—the owner of this patent. Drummond's vanguard development efforts resulted in a number of issued United States patents including for example U.S. Pat. Nos. 3,834,240; 3,963,061; 4,461,328; 4,624,147; 5,104,625; 5,214,968; 5,294,405; 5,616,871; and U.S. Pat. No. 5,090,255.

Drummond Scientific's associated pipetter products have been highly successful in the marketplace—making Drummond a leader in the pipetter field. For example, Drummond was one of the first if not the first to develop a practical, economical handheld gun-shaped portable pipetter device that allowed a laboratory technician or other user to depress variable-stroke push buttons to vary the amount of suction applied to the uppermost end of a pipette. To dispense liquid using this type of device, the user simply attaches a pipette to the gun-shaped handle and places the bottom end of the pipette into a liquid to be dispensed. Depressing the top button with a forefinger causes the pipetter to apply suction that draws liquid up into the pipette tube. This power suction allows the pipette to draw a liquid level higher than the level in the liquid reservoir sourcing the liquid being drawn. Upon attaining a desired column height, the user releases the top button to seal the top end of the pipette tube and thus maintain the liquid column level in the tube. The user may then lift the pipette out of the initial fluid reservoir and place it into or above the container into which the fluid is to be dispensed.

The user dispenses the fluid by depressing a down button while watching the descending column height relative to the graduations marked on the pipette tube. The user releases the down button when the desired quantity has been dispensed. The user may dispense additional quantities, or "aliquots," into additional receptacles until most or all of the fluid within the pipette tube has been dispensed. The entire process may be repeated multiple times. Power dispensing reduces dispensing time and can also help to mix the fluid with contents already present in the container into which the fluid is being dispensed.

In this type of device marketed by Drummond in the past, the up and down buttons are coupled to needle or other valves having variable apertures. This allows the user to control the speed of aspiration or dispensing by varying the amount of pressure he or she applies to the up and down buttons respectively. A light touch on the button results in slower aspiration or dispensing, while a more firm depression increases the rate at which the fluid is drawn up or dispensed from the pipette tube. In come contexts, users may wish to dispense with some force so the dispensing agitates and mixes the resulting solution in the receptacle into which the liquid is being dispensed. In other cases, the user may be very concerned about dispensing nearly exact quantities and so will use a slower dispensing speed while more carefully watching the fluid column height relative to visual graduations on the pipette tube.

The Drummond products described above have worked extremely well over the years in a wide variety of laboratory contexts and have therefore been very successful. However, there are some instances when it would be desirable to reduce the amount of skill and potential tedium required to accurately dispense a large number of nearly identical quantities of fluid aliquots into a number of receptacles. In the industry, there has been a long felt but unsolved need for a relatively inexpensive, handheld or other dispensing apparatus that can be coupled to a standard laboratory pipette and which can be programmed to accurately and repetitively dispense a precise amount of liquid.

In the early 1990s, Drummond Scientific worked to solve this problem by developing an automatic pipetter based on a precision syringe and piston. See U.S. Pat. No. 5,090,255. A microcontroller operated a motor which in turn was mechanically coupled to the piston via a threaded shaft. Moving the piston out of the syringe by a precise displacement created suction which drew liquid into the pipette. Plunging the piston into the syringe a precise displacement caused a precise corresponding quantity of fluid to be dispensed from the pipette. The amount the piston was displaced precisely controlled the amount of fluid being "aspirated" or dispensed. This design was quite successful in automatically repetitively dispensing programmable amounts of liquid with a high degree of accuracy and precision. However, a disadvantage was the relatively high cost and complexity of the positive-displacement syringe-and-plunger arrangement. Positive-displacement-type devices are often handicapped by slower dispensing speeds and total column-height volumes that are limited to the plunger displacement volume. This means that handheld devices are generally limited due to the portability issue. It would therefore be highly desirable to provide automatic dispensing functionality in the context of a less expensive, more portable, all-electronic design not subject to these limitations.

One of the challenges to providing an improved automatic dispensing design relates to the number of variables that computer control needs to take into account in the context of a so-called "non-contacting" open-loop system to provide a requisite degree of accurate dispensing. One might initially think, for example, that it would be relatively straightforward to use a liquid flow sensor to accurately measure the amount of liquid being dispensed in the context of a conventional closed-loop control system. However, it must be remembered that many laboratory procedures require that no part of the dispensing apparatus other than the disposable or non-disposable, sterilized pipette come into contact with the fluid being dispensed. It is therefore undesirable or impossible in many contexts to use a flow sensor in contact with the fluid being dispensed to monitor fluid flow amount.

We have now discovered a way to control a relatively simple, inexpensive pipetter or other fluid dispenser to provide precision, repetitive, automatic dispensing of programmable fluid quantities. One exemplary, illustrative implementation of our technique mathematically models the pneumatic system of the dispensing apparatus—including the removable pipette tube—with a non-linear model. There are various methods by which the pipette and pipetter systems can be modeled. One exemplary illustrative non-limiting arrangement is aspirating to a specific and consistent column height, and dispensing in fixed time increments. Through such non-linear mathematical modeling, a computing element such as for example a relatively inexpensive microprocessor can be used to accurately control valve aperture and/or pump power to achieve relatively high precision of dispensing quantity in the context of an inexpensive handheld gun shaped or other pipetter or other dispensing system.

Non-limiting, exemplary illustrative advantages of our approach include for example: avoids need for positive displacement type syringe-piston arrangements and/or expensive, complicated peristaltic or other pumps mathematically and physically models non-linear system to provide a high degree of accuracy and precision open-loop system—avoids need for closed-loop control relatively light weight inexpensive, rugged design simple, reliable mechanics easy to operate, intuitive operation precise repetitive automatic dispensing of aliquots relatively quiet operation can correct for a variety of factors including, for example, dispensing at different angles, different pipette diameters, changing pump motor efficiency, different fluid viscosities, other drip prevention or elimination users not required to constantly pay attention to graduations on pipette tube during automatic dispensing electronic controller/substantially all electronic design programmable dispensing amount electronic valve and pressure sensor no contact/no fluid sensing orifice pressure and vacuum operation handheld (e.g., gun shaped)

controllable automatic dispensing rate and quantity accommodates differently sized pipettes in some implementations high accuracy (e.g., 1% or greater)

high repeatability relativistic in operation self-powered intuitive graphical display and associated user interface vane type electronic pump in some implementations reversible orifice valve in some implementations reversible pump motor in some implementations plural pressure sensors in some implementations look-up table in some implementations no pressure sensors in some implementations combined high-speed multiple decrements to achieve single larger volume aliquot dispensings blocked filter detector substantial increase in speed and efficiency of dispensing, reducing lab labor expenses and time use of large volume pipettes to accurately dispense very small aliquots, reducing aspirations and decreasing the quantity of pipettes required and/or changed automatic aspiration to preset column heights automatic aspiration when pipette tip is inserted in liquid look-up table or formula-based dispensing single calibration for all pipette sizes make use of any volume pipette, including 100 ml or greater, without being negatively impacted in dispensing accuracy or precision.

In one non-limiting, exemplary illustrative implementation, a pressure calibration technique is used to establish a base line. In one exemplary illustrative implementation, two column height pressure readings are taken: one for a given column height near the top of the pipette and another for a given column height near the bottom of the pipette. These pressure readings are used to calculate constants for a mathematical equation that outputs valve open time and/or pump power for dispensing a desired quantity of liquid. During active dispensing, column height pressure is continually monitored and used to calculate or look up the corresponding valve and/or pump control parameters. Accuracies better than 1% have been achieved.

BRIEF DESCRIPTION OF THE DRAWINGS

These and other features and advantages will be better and more completely understood by referring to the following detailed description of exemplary, illustrative, non-limiting implementations in conjunction with the drawings, of which.

DETAILED DESCRIPTION OF EXEMPLARY NON-LIMITING ILLUSTRATIVE IMPLEMENTATIONS

Figure 1:
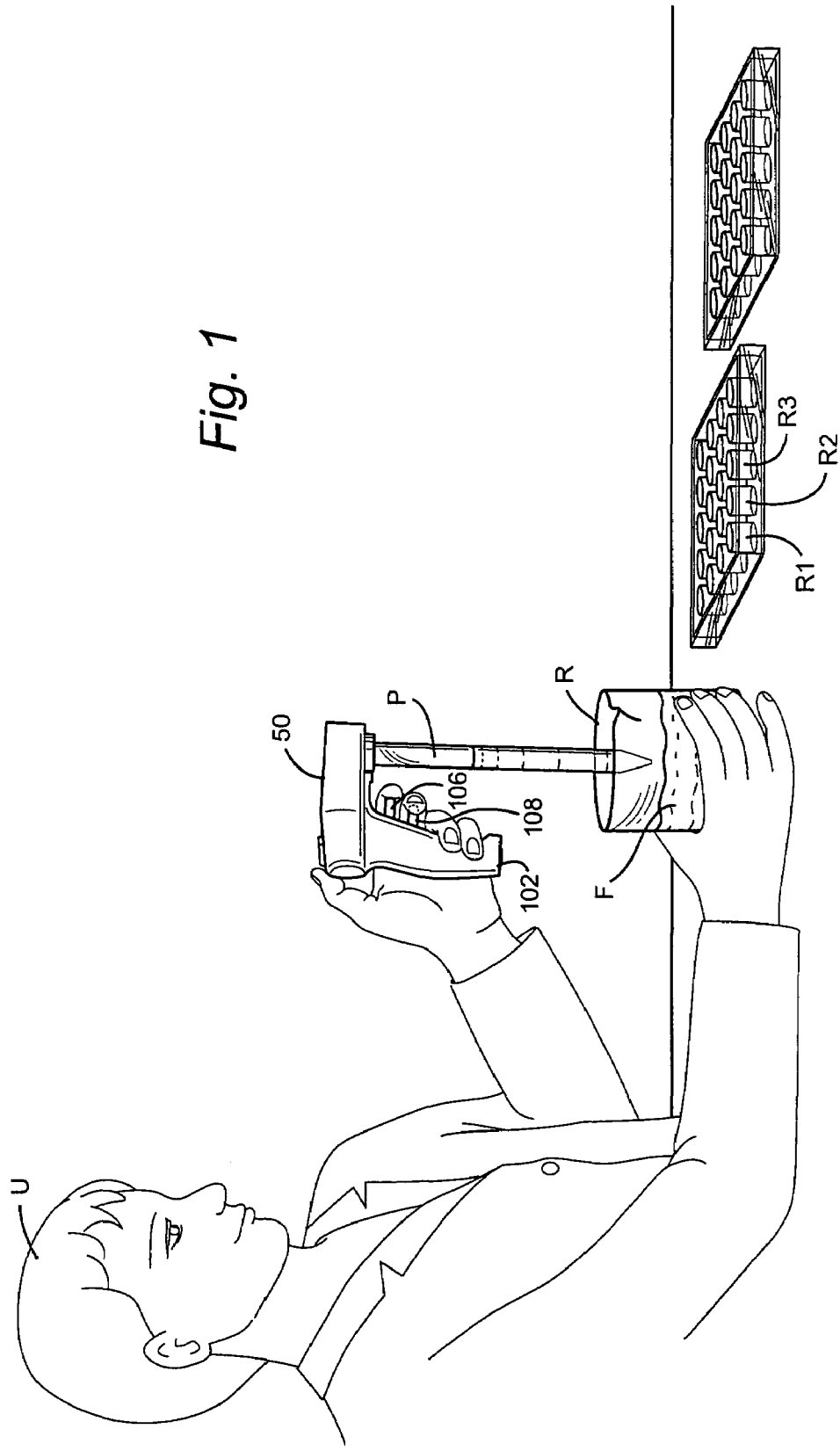
FIG. 1 shows an example laboratory environment in which a pipetter dispensing device might be useful.

FIG. 1 shows an illustrative exemplary non-limiting implementation of a hand-held electronic pipetter 50. Illustrative non-limiting pipetter 50 in this exemplary implementation is a self-contained, hand-held, lightweight, relatively inexpensive, easy-to-use device that allows a user U to easily and quickly automatically dispense repetitive quantities of liquids or other fluids with a high degree of accuracy and precision. As FIG. 1 illustrates, a user U such as a lab researcher or technician first removably attaches a conventional or non-conventional pipette P to the pipetter 50. In the exemplary illustrative implementation, pipette P may, for example, comprise a standard conventional off-the-shelf pipetter of the type commonly available from a wide variety of laboratory supply houses. Such a pipette P may be made for example of glass or plastic, and it may be disposable or non-disposable. It may have graduations imprinted on its outside surface, or it may not. Different standard laboratory pipettes come in different lengths and diameters for use with different quantities of liquid. Exemplary illustrative non-limiting implementation of pipetter 50 can accept various different standard-capacity pipettes P.

Once user U attaches the pipette P to pipetter 50, the user grasps the gun-shaped handle 102 and inserts the pipette lowermost end into a receptacle R of fluid F to be dispensed. The user U then depresses an uppermost button 106 with his or her "trigger" finger to command pipetter 50 to draw fluid F from receptacle R into the pipette P. The user U may now release the upper button 106 and lift the pipette P out of receptacle R. With both buttons 106, 108 released, the pipetter 50 seals the open valve-end of pipette P to retain fluid F within the pipette P.

The user U may now position the lowermost end of pipette P over a further receptacle R1 into which some desired quantity of fluid F is to be dispensed. In the preferred exemplary illustrative implementation, the user may program pipetter 50 with this desired quantity (e.g., 5.2 ml). When the user U depresses lowermost button 108 with his or her index finger, pipetter 50 automatically dispenses substantially the programmed quantity into the receptacle R1. The user U may repetitively depress lowermost button 108 to accurately dispense substantially the same programmed quantity into each of a number of additional receptacles R2, R3, etc. In the exemplary illustrative non-limiting implementation, when insufficient quantity of fluid F remains within pipette P, the pipetter 50 automatically tells the user U that the pipetter needs to be refilled. The user U may then return pipetter P to the initial receptacle R to draw an additional quantity of fluid F to be dispensed. This process may continue repetitively until all of the desired receptacles have received desired quantities of fluid.

Using the illustrative exemplary non-limiting implementation of pipetter 50 disclosed herein, the user during the dispensing process does not need to pay any attention to the graduations on pipette P (in fact, such graduations need not even be present in some implementations). Rather, the user U knows that each time he or she depresses the lowermost button 108, device 50 will automatically, reliably dispense the programmed desired quantity. This automatic operation not only speeds up dispensing dramatically, but also reduces the tedium and required skill level needed for accurate dispensing. Because of the consistency and precision at which exemplary illustrative non-limiting implementation of pipetter 50 dispenses programmed quantities, lab results may have a higher degree of reliability even when conducted by less skilled laboratory personnel. This can be especially important in the health care and basic research fields where a patient's diagnosis depends on accurate lab results or where basic research may be called into question because of less precise lab work.

Exemplary Illustrative Non-Limiting System Design

Figure 2:
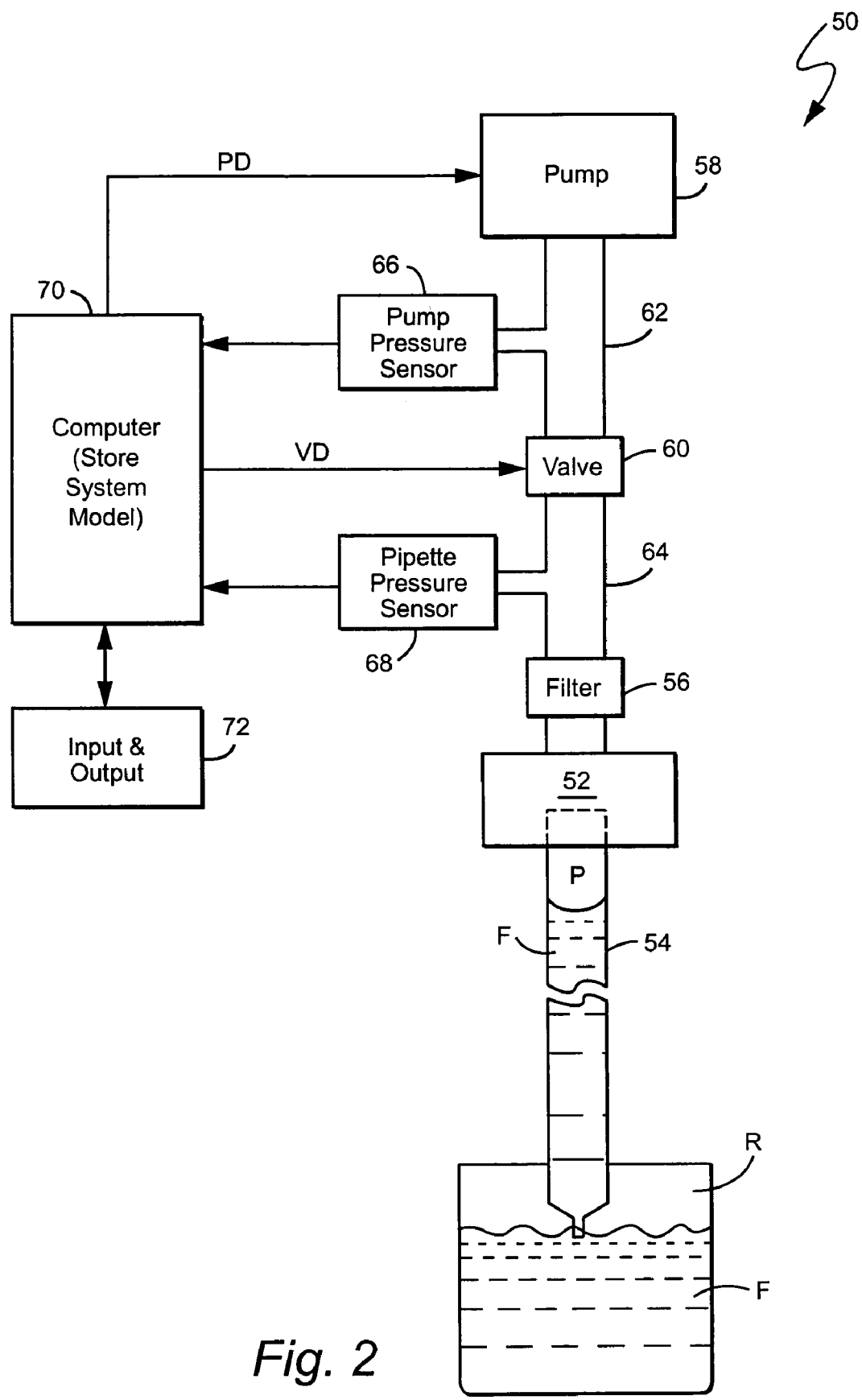
FIG. 2 shows an example non-limiting illustrative schematic diagram of a pipetter dispensing device design.

FIG. 2 shows a schematic diagram of an example illustrative non-limiting implementation of fluid dispensing system 50. System 50 includes a coupler 52 to which is removably attached a disposable or non-disposable conventional pipette 54 or other conventional dispensing fluid tube. Coupler 52 may be designed to be compatible with any number of different conventional or non-conventional pipette 54 designs including for example standard 25 ml, 50 ml or other capacity glass or plastic pipettes for serological or other laboratory use, micropipettes, or any other desired dispensing tube. In one exemplary illustrative implementation, a filter 56 that is in fluid contact with (and which may be part of) coupler 52 prevents fluid drawn into the pipette 54 from reaching the remainder of the components of system 50. If a user overdraws the fluid into pipette, the fluid will be blocked by filter 56 which may be removed and replaced to maintain sterile conditions and eliminate cross-contamination. The filter used in the pipetter can be, for example, a hydrophilic filter, which completely blocks the passage of air when it becomes damp (ensuring that the pneumatic system is not compromised or contaminated). The current system is able to detect when the filter has been compromised in the following manner: (1) valve closed; pump activated; pump-side sensor read. (2) valve opened; sensor read continuously for "x" milliseconds. (3) If there is no measurable pressure delta detected, the filter is determined to have been compromised by liquid contact, thus preventing air flow.

A pump 58 is pneumatically connected to coupler 52 through a valve 60. Plastic molded or other passages 62, 64 fluid-couple the pump 58 to valve 60 and valve 60 to coupler 52 respectively. An electronic pressure sensor 66 of conventional design monitors the pressure within passageway 62 between pump 58 and valve 60, and a second electronic pressure sensor 68 monitors the pressure within passageway 64 between valve 60 and coupler 52. Pressure sensor 66 is sometimes referred to in this specification as the "pump-side" pressure sensor because it monitors pump output pressure, and pressure sensor 68 is sometimes referred to as the "pipette-side" pressure sensor because it monitors the pressure at the top of the column of liquid within pipette P. In some implementations, only one pressure transducer may be used or required.

Pressure sensors 66, 68 generate outputs that are applied, in this exemplary illustrative non-limiting implementation, to a computer 70 such as for example a conventional microprocessor unit. Computer 70 also generates, by itself or with assistance of other associated driving circuitry, a pump drive signal to drive pump 58 and a valve drive signal VD to drive valve 60. Computer 70 receives user inputs and generates user outputs via block 72 shown in FIG. 2. In the exemplary implementation, computer 70 generates appropriate pulse-width modulated outputs to pump control 59 (FIG. 4) and to valve 60 under software control in response to depression of buttons 106, 108 and also in response to the pressures measured by pump-side sensor 66 and pipette-side sensor 68. Computer 70 stores software routines in firmware along with operating formulas with stored constants defining a model of system 50. Computer 70 in the exemplary illustrative non-limiting implementation includes an internal writable non-volatile memory used to store calibration data for different pipette configurations and diameters. We have designed the device to be field-reprogrammable by the user. The product will have a standard PC USB-type interface. User's will be able to go to Drummond's website and purchase and/or access upgrades, more specific troubleshooting and calibration routines, etc.

In the exemplary illustrative non-limiting implementation shown in FIG. 2, accurate precision dispensing is achieved without directly measuring the flow rate of fluid flowing into or out of pipette 54. In more detail, computer 70 indirectly ascertains fluid flow by measuring pressure. It reads the pressure (vacuum) P at the top of fluid column F at various points, and uses this measured pressure information along with empirical data and parameters stored within the computer to calculate a control output.

In one exemplary illustrative non-limiting implementation, the control output comprises a time value T used to control the opening of valve 60. In certain exemplary illustrative non-limiting implementations, computer 70 may, in addition or instead of controlling valve 60 opening time, control the valve's opening aperture and/or the power and/or direction of pump 58. In certain non-limiting exemplary implementations, pump 58 is a conventional continuous air pump with a fixed pumping rate while another exemplary illustrative non-limiting implementation's pump 58 is a vane or other type variable-speed pump the pumping rate of which can be controlled by computer 70. In still other implementations, pump 58 could be replaced or supplemented with a tank or other reservoir of pressurized gas (e.g., a pressurized $CO_2$ cartridge). In some non-limiting exemplary illustrative implementations, valve 60 is a digital on/off valve that is either open or closed, whereas in other exemplary illustrative non-limiting implementations the valve has a variable aperture opening that computer 70 may control by applying a variable signal to the valve. In some exemplary illustrative non-limiting implementations, the pump-side pressure sensor 66 may be eliminated and computer 70 may in such cases rely on only one (or no) pressure sensor.

Figure 3:
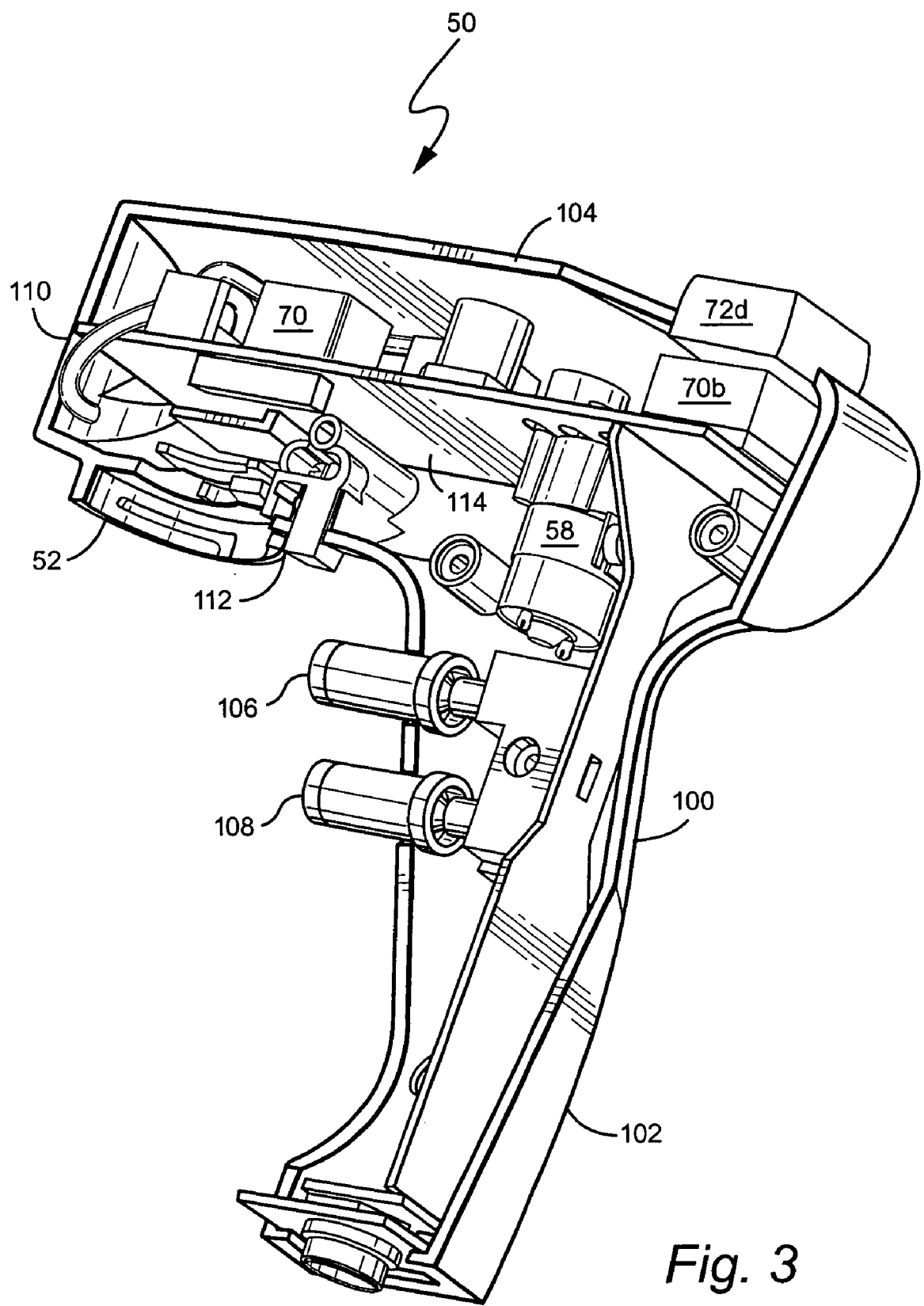
FIG. 3 shows an example non-limiting illustrative gun-shaped implementation.

FIG. 3 shows a cutaway view of an exemplary illustrative non-limiting handheld implementation of the FIG. 2 dispensing system 50. The handheld gun-shaped implementation shown in FIG. 3 is only one example—a variety of other implementations are possible including stationary, tabletop, embedded, shapes other than a gun, and many other implementations. In the non-limiting exemplary illustrative implementation shown in FIG. 3, a gun-shaped housing 100 includes a handle portion 102 and a main housing portion 104. Up pushbutton 106 and down pushbutton 108 are disposed partially within handle portion 102. The user depresses up pushbutton 106 to aspirate liquid into pipette 54, and depresses down pushbutton 108 to dispense liquid from the pipette. In the exemplary illustrative implementation shown, pushbuttons 106, 108 are variable-travel pushbuttons coupled to Hall effect magnetic or other sensors that provide the user with variable control over aspiration and dispensing rate.

At a distal end 110 of main housing portion 104, a conventional coupling arrangement 112 is disposed to accept and retain the open end of pipettes 54. In one conventional design, a user couples a disposable pipette to the coupler 52 to dispense a certain liquid, and then removes and throws away the disposable pipette once all of the liquid has been dispensed. The user uses a fresh sterilized disposable pipette to dispense a different liquid. In other arrangements, laboratories may use higher precision pipettes made of glass or other materials that are washed and sterilized after each use. In still other implementations, it could be desirable to semi-permanently or permanently couple a pipette or other dispensing tube to system 50 in which case coupler 52 might not be needed in the configuration shown. In one exemplary implementation, a switch 112 is used to detect whether a pipette 54 has been coupled to coupler 52 and to feed that information to computer 70.

In the example shown, computer 70 is mounted on a printed circuit board 114 within main housing portion 104. Other components such as capacitors, resistors and the like may also be disposed on a printed circuit board 114. Pump 58 is connected electrically to computer 70 via appropriate conventional motor drive circuitry also disposed on printed circuit board 114. Pressure sensors 66, 68 are also preferably provided on printed circuit board 114 in the exemplary illustrative non-limiting implementation shown. The FIG. 3 implementation may be entirely self-contained (e.g., including rechargeable or non-rechargeable batteries not shown that may be disposed within housing handle portion 102), or the system 50 may rely on external battery and/or other external components to operate. However, in one exemplary illustrative non-limiting implementation, lightweight self-contained, portable, cordless operation is achieved.

Figure 4:
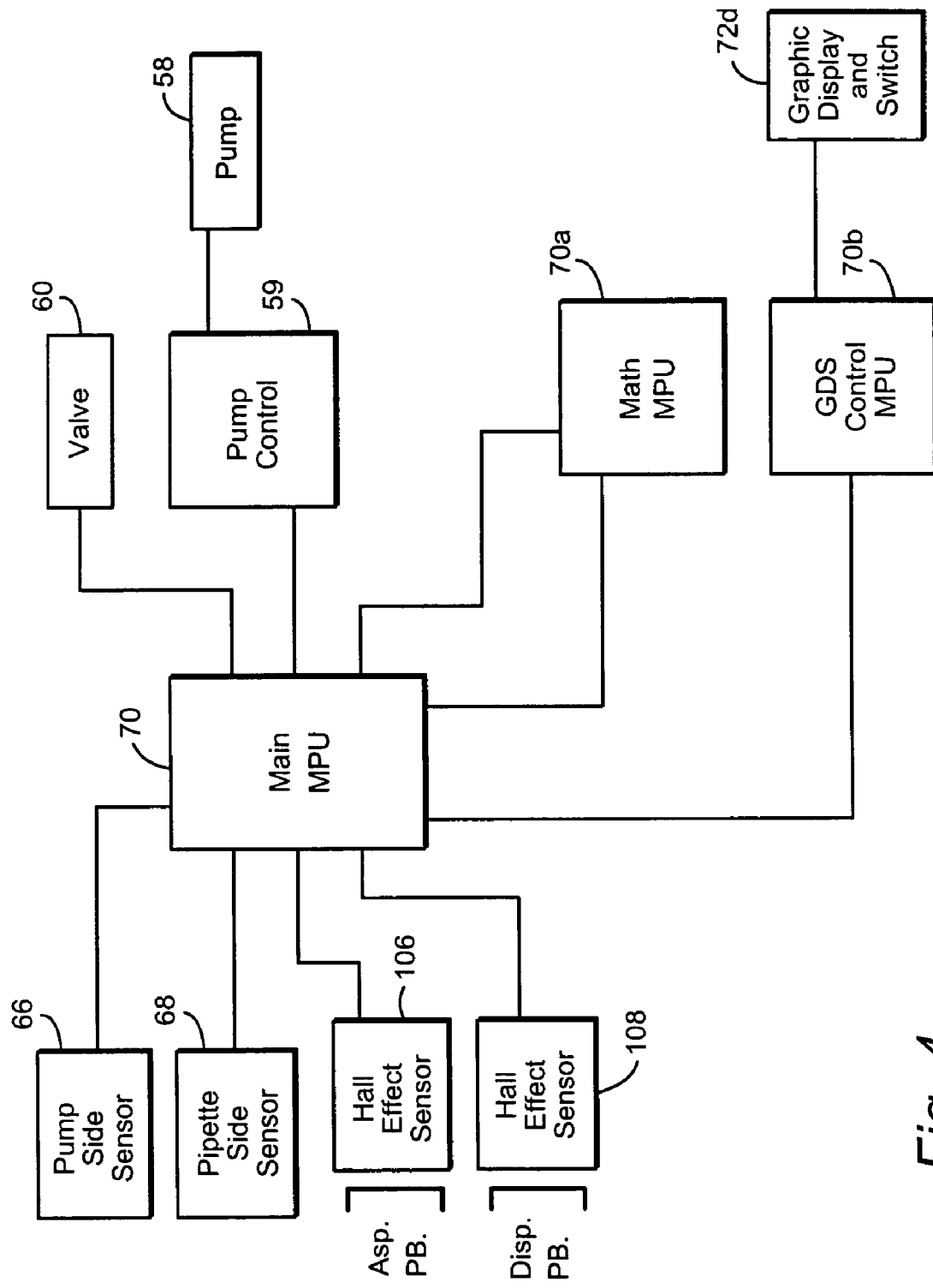
FIG. 4 shows an example more detailed electronic schematic block diagram of an exemplary non-limiting illustrative implementation.

FIG. 4 shows an exemplary illustrative non-limiting more detailed schematic block diagram wherein main microprocessor 70 is coupled to a math coprocessor 70a and a graphical display system coprocessor 70b. Math coprocessor 70a efficiently performs mathematical computations in real time, whereas graphical display system coprocessor 70b provides graphic handling to generate images for viewing on a graphical display unit such as a liquid crystal display and associated depression switch or switches 72d. Main microprocessor 70 controls pump 58 via a pump control unit 59. Pump control unit 59 may for example comprise a pulse width modulated motor controller that receives a pulse switch modulated control signal of approximately 1 kHz from main microprocessor 70. Valve 60 may be controlled by main microprocessor 70 through a field effect transistor or other electronic switch not shown. In the exemplary embodiment, pump-side pressure sensor 66 and pipette-side pressure sensor 68 each comprise conventional differential pressure sensors generating analog outputs wherein the approximate center of the sensor output range indicates atmospheric pressure with, for example, an increased output indicating negative pressure and a decreased output indicating positive pressure. In one exemplary implementation, pressure sensors 66, 68 generate outputs between 0 and 5 volts DC with 2.5 volts DC output indicating atmospheric pressure. Main microprocessor 70 in the exemplary implementation includes conventional analog-to-digital converters that convert the pressure transducer output signals into digital bit values for storage and manipulation. In this exemplary illustrative implementation, an output from one of pressure transducers 66, 68 that is greater than 2.5 volts DC indicates vacuum, while an output that is less than 2.5 volts DC indicates positive pressure relative to atmospheric.

Exemplary Illustrative Non-Limiting Software Architecture

Figure 5:
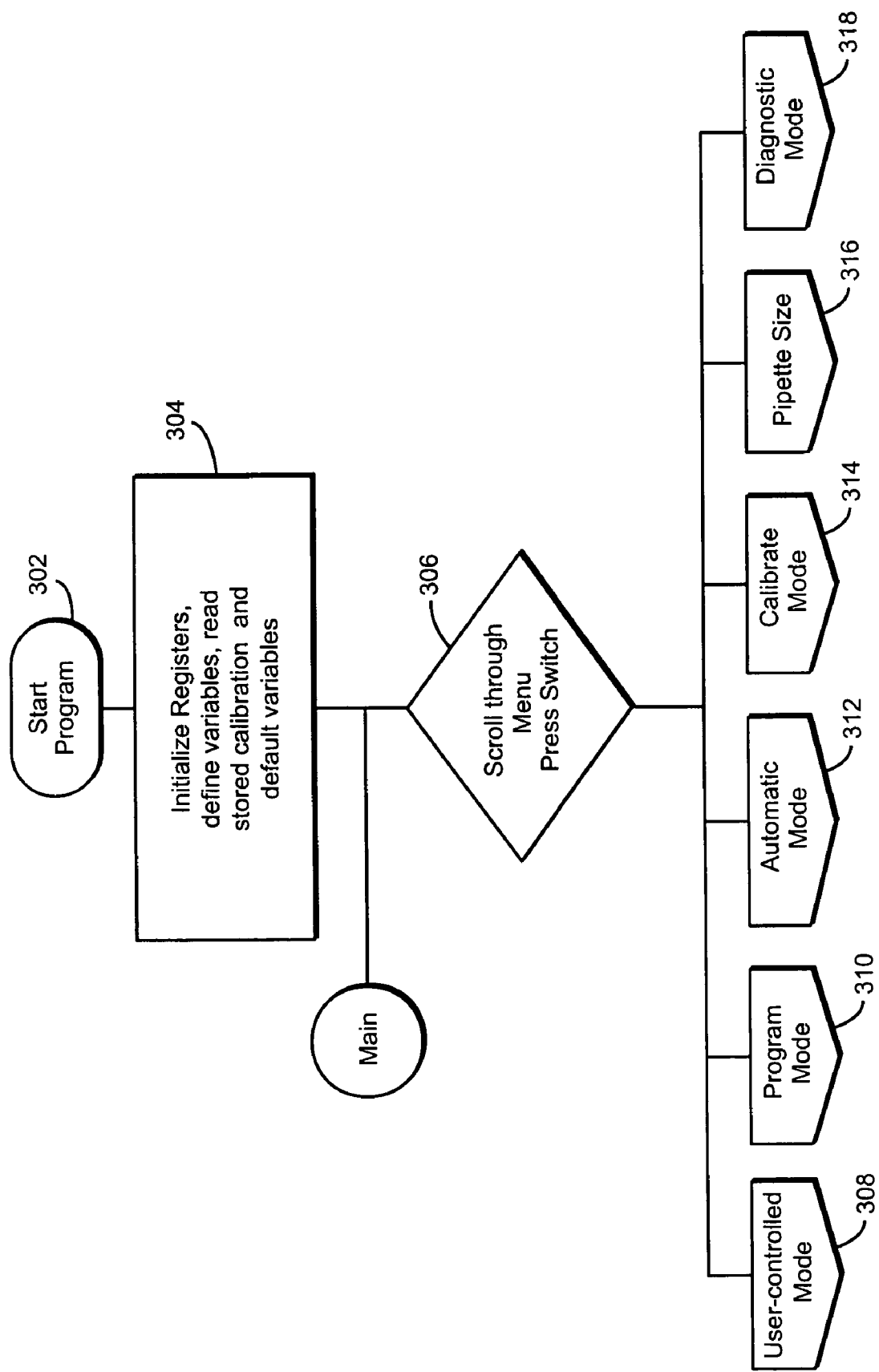
FIG. 5 shows an example main software routine of an exemplary non-limiting illustrative exemplary implementation.

FIG. 5 is a flowchart of an exemplary illustrative non-limiting main routine performed by microprocessor 70. In this exemplary illustrative non-limiting implementation, upon unit start up (block 302) the main microprocessor initializes its registers, defines variables, reads stored calibration and default stored calibration and default variables, and performs other housekeeping functions (block 304). For example, in one exemplary illustrative non-limiting implementation, the main microprocessor 70 initializes its port A for analog input readings, port C for outputs, port D for other inputs and also sets a pulse-width modulation (PWM) register in addition to turning on a pulse-width modulator timer. The main microprocessor may also read data from EPROM or other non-volatile storage of stored calibrated values and variables.

In one exemplary illustrative non-limiting implementation, the main microprocessor 70 then controls the graphical display processor 70b to display a main menu of operating modes selectable by the user (block 306). Operating modes may include for example:
  user-controlled mode,
  program mode,
  auto mode,
  calibrate,
  choose pipette size,
  diagnostic mode,
  other.

These operating modes are exemplary only. There may be other additional modes such as for example a "blast" mode that causes dispensing system 50 to operate in a squirt gun or "water pik" type pulsating rapid dispensing operation for use as an agitator. Other implementations may have fewer or different modes than the ones described above. For example, in one exemplary illustrative non-limiting implementation, the diagnostic mode 318 may simply show the firmware version of software. In other exemplary implementations, other more complicated functions may be invoked depending upon need.

In the exemplary illustrative implementation, mode selection is accomplished without requiring additional complex input controls through use of a simple, easy to understand graphical user interface that can be displayed on a compact display such as a liquid crystal display. For example, the display 72d can display a menu item at the top of the display with an arrow indicating that if the switch is pressed, that menu item will be performed. As the up and down buttons 106, 108 are pressed, the menu items scroll in that direction— and thus the same buttons used for dispensing can also be used for menu navigation (in one exemplary illustrative implementation menu option selection is accomplished by the user depressing the liquid crystal display 72d itself— which actuates a switch closure). The main microprocessor 70 reads the pushbutton states 106, 108 as well as an additional select switch that may be part of the liquid crystal display 72d. If the up or down pushbutton 106, 108 reaches a threshold, then the main microprocessor scrolls the menu up or down indicated by the buttons. If the switch is pressed, the main microprocessor jumps to the menu item's location and software. As the menu items scrolls up or down, the menu follows. If the last menu item is at the top, then the first menu item scrolls back to the top following the last menu item. This takes place until the switch is pressed. In the exemplary illustrative implementation, the menu will scroll once per up or down button depression. The system 50 waits until the button is released before it continues and performs the indicated task. The system scrolls once per button press in the exemplary illustrative implementation.

In one exemplary illustrative non-limiting implementation, a user-controlled mode 308 is provided. Under this mode of operation, the dispensing system 50 will aspirate or dispense directly in response to depression of pushbuttons 106, 108 by the user. Microprocessor 70 automatically performs software controlled functions in response to such button depressions. Although the "user controlled mode" is operated by the pushbuttons, there are distinguishing characteristics that demonstrate that the "user controlled mode" is not a computer-facilitated manual mode, but actually a significantly enhanced function that cannot be emulated in any current manually deployed system. A true manually operated pipetter in the aspirate mode does not permit the liquid level to decrease—it either remains stable or rises. Conversely, in the dispensing mode, the liquid only falls. When flow is valve aperture-dependent, emulating that mode electronically is very simple and straightforward. When the valve aperture is fixed, however, and flow is pump-dependent, the opportunity exists to use electronic control to greatly enhance the user's ability with respect to precision, particularly if pressure on either side of the valve can be ascertained. By constantly monitoring the liquid column height (pipette-side sensor) and comparing it to the pump-side sensor, the aspirate button can be used to both aspirate and dispense, whereby the valve is opened initially upon the sensors' outputs being equal, and remaining open until the aspirate button is fully released. For example, if the liquid column height in a 50 ml pipette were 40 ml, and additional liquid were to be aspirated from that starting point, the aspirate pushbutton would need to be depressed until the pump-side pressure sensor indicated an equivalent (or better) pressure relative to the pipette-side sensor. Once the valve was opened, the aspirate button could then be both increased and decreased (by displacement) to precisely allow the user to raise or lower the column height with respect to the desired pipette fill volume. Manual systems require both the aspirate and dispense buttons be used in the event of any "overshoot".

Figure 6:
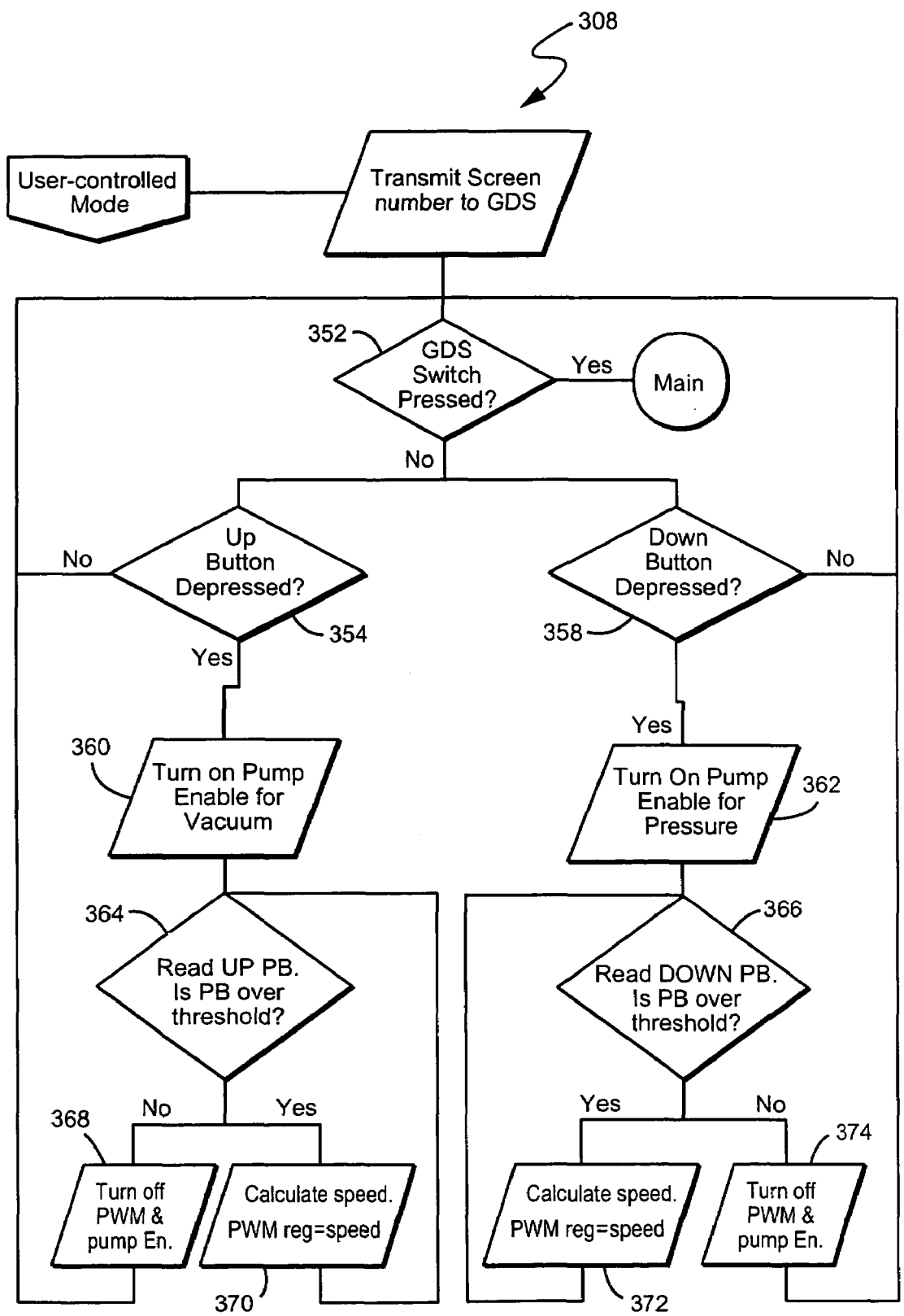
FIG. 6 is a flowchart of an exemplary non-limiting illustrative user-controlled mode software routine implementation.

FIG. 6 shows an exemplary illustrative non-limiting flowchart for a user-controlled operating mode 308. In this example, system 50 will continue to operate in the user-controlled mode until the graphical display switch is pressed. Using the up and down pushbutton switches, microprocessor 70 controls pump 58 to aspirate or expire liquid based on the pushbutton switch 106, 108 being depressed. When a pushbutton 106, 108 is pressed, a magnet on the end of the pushbutton comes closer to a Hall effect sensor. The distance between the magnetic and sensor is translated into a voltage which is converted to a digital bit count, which is compared to a threshold bit count set in software to see if the button is pressed far enough to turn on the pump (FIG. 6, blocks 352, 354, 356). Depressing the up button 106 will aspirate fluid—meaning that microprocessor 70 turns on pump 58 in an appropriate direction to generate vacuum (block 360). Depressing the down button 108 causes microprocessor 70 to turn on pump 58 in a direction to generate pressure (block 362). In other exemplary embodiments, a uni-directional pump could be used with different valve-controlled ports being opened to provide positive pressure and vacuum respectively. Thus, if the up button 106 is pressed, pump 58 will turn on in the direction to provide vacuum and the speed will change based on an algorithm using the bit count of the voltage reading from the Hall effect sensor. The speed of pump 58 will increase as the button is pressed further into the button assembly. Maximum speed will be attained when the magnet comes in closest contact with the sensor. As the button is retracted, the speed will decrease based on the same algorithm in the exemplary illustrative non-limiting implementation. The bottom button 106 in the exemplary illustrative non-limiting implementation acts the same way for speed control but reverses to produce pressure. In the exemplary illustrative non-limiting implementation, the pump speed is changed based on the pulse width modulated pulse output from microcontroller 70. The pulse-width modulation is the amount of time or duty cycle a pulse is on during one cycle of a timer. Generally, the duty cycle of a pulse-width modulated signal can range from 0% to 100%. However, in particular implementations, pump 58 may not be able to handle so large a dynamic range. In one exemplary illustrative implementation, the pump 58's pulse-width modulation range is constrained to be within the range of 33% duty cycle to 70% duty cycle but can change based on modeling of the system 50. At 33%, or low range, the pump is in its maximum speed operation. At a 70% duty cycle in the exemplary illustrative embodiment, the pump operates at its slowest speed.

Figure 7:
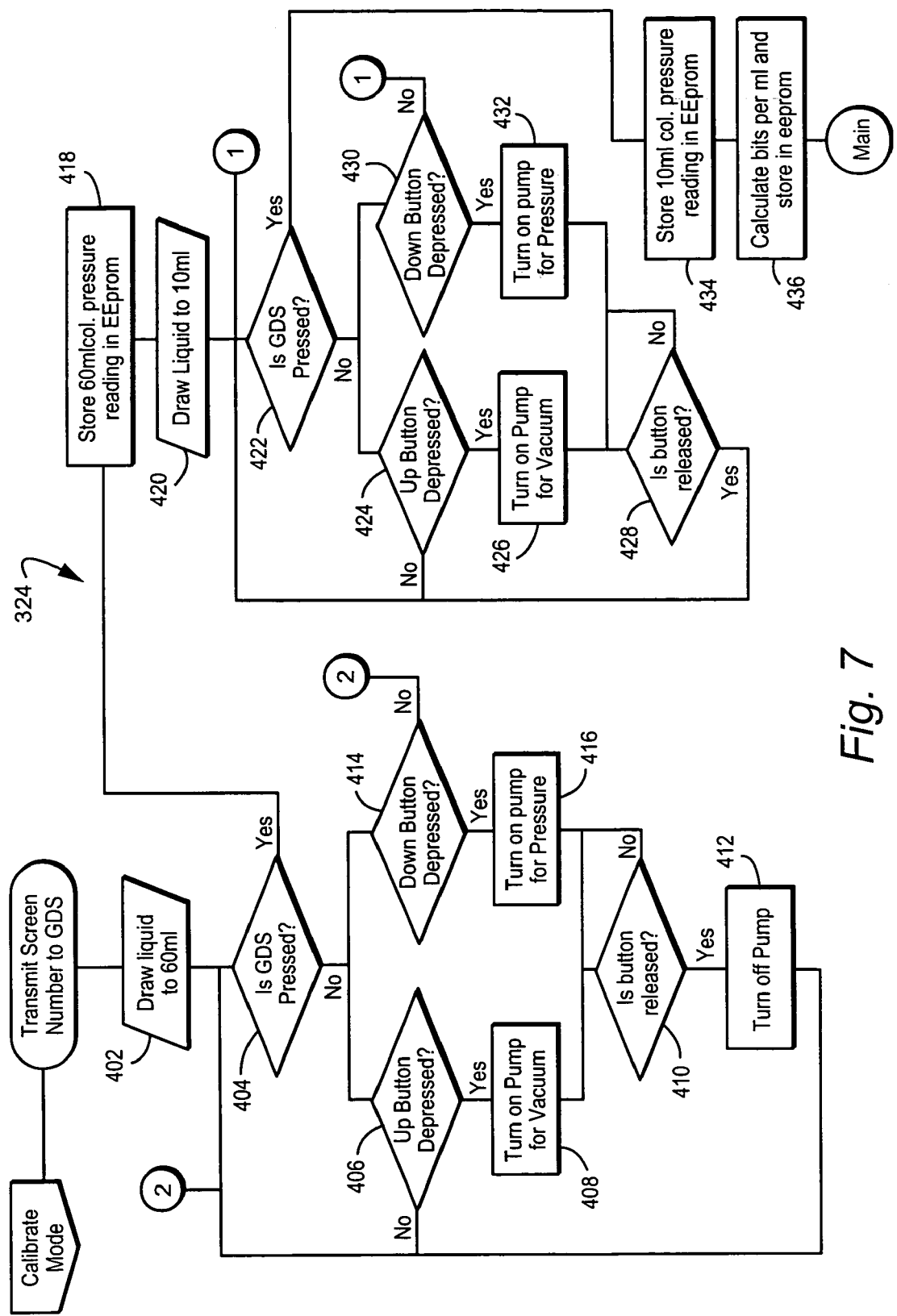
FIG. 7 is a flowchart of an exemplary non-limiting illustrative software routine implementation for a calibrate mode.

FIG. 7 shows an exemplary illustrative non-limiting implementation for a calibrate mode 314. In the example shown, the calibrate mode is used preparatory to automatic dispensing in the automatic mode 312. In the calibrate mode shown, microprocessor 70 causes display 70d to display an instruction to the user to aspirate a predetermined amount of liquid which is preferably near the top of the maximum column height of the pipette being used. For example, in the case of a 50 ml pipette, system 50 may direct the user to aspirate 60 ml of fluid into the pipette (block 402 Many standard pipette volumes have approximately 20% additional column height capacity. For example, a standard laboratory 50 ml pipette is graduated to 60 ml. We can use the 60 ml graduation to achieve greater accuracy during calibration (correlation between different pipette sizes is a linear function). This level is just an example—other levels may be used. In general, this particular level should however be near the maximum quantity that the pipette 52 can draw to avoid extrapolation errors later.

In response to the displayed message, the user depresses the up pushbutton 106 just as in the manual mode until the predetermined requested level is reached by eye (FIG. 7 blocks 404, 406, 408, 410, 412). The down button 108 is also available if the user mistakenly over aspirates in order to correct the level to exactly the desired one (blocks 414, 416). Once the user has aspirated the desired level, the user presses the switch on the graphical display 70d. At this point, system 50 takes multiple (e.g., 5) readings of the column height pressure using the pipette-side sensor 68, averages the multiple readings and stores the resulting average as a variable (block 414).

In the exemplary illustrative non-limiting example, the user is then asked to aspirate to a predetermined level near the bottom of useful column heights accommodated by pipette 52. In one example, the user may be asked to take the liquid level down to for example 10 ml (FIG. 7, block 416). The user may of course do this by fully exhausting all of the liquid already in the pipette 52 and starting again, or he or she may simply dispense all but the desired liquid level that is already within pipette 52 from the initial calibration aspiration. As before, the user may depress up and down pushbuttons to achieve the desired aspiration level (FIG. 7, blocks 422-432). Once the desired level has been obtained, the user depresses the button on the graphical display 70d (decision block 422) which results in microprocessor 70 storing the corresponding pressure reading from the pipette-side pressure sensor 68 (FIG. 7, block 434). If desired, multiple pressure readings may be taken and averaged as above. System 50 then calculates the bits per ml based on the calculation of the high and low aspiration level pressures stored in blocks 418, 434 (block 436). System 50 may also at this time calculate the lowest possible level for dispensing from a particular pipette 52 (e.g., 3 ml). All calibration variables are stored in EPROM in the exemplary illustrative non-limiting implementation for later retrieval and calculations. The system 50 remains in this mode until the graphical display switch 70d is pressed at which time the system returns to the main menu.

Figure 8:
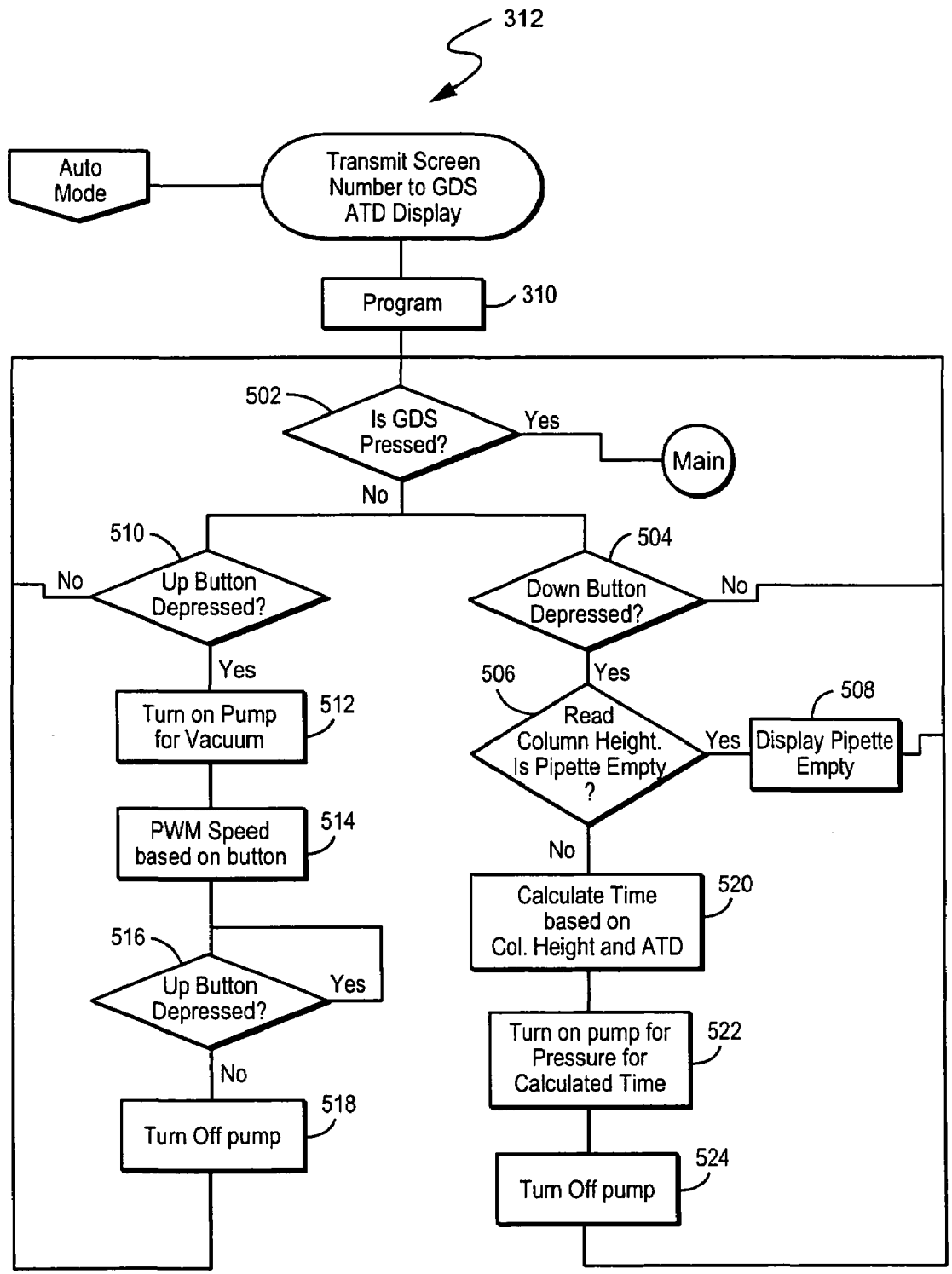
FIG. 8 is a flowchart of an exemplary non-limiting illustrative automatic dispensing mode software routine.
Figure 10:
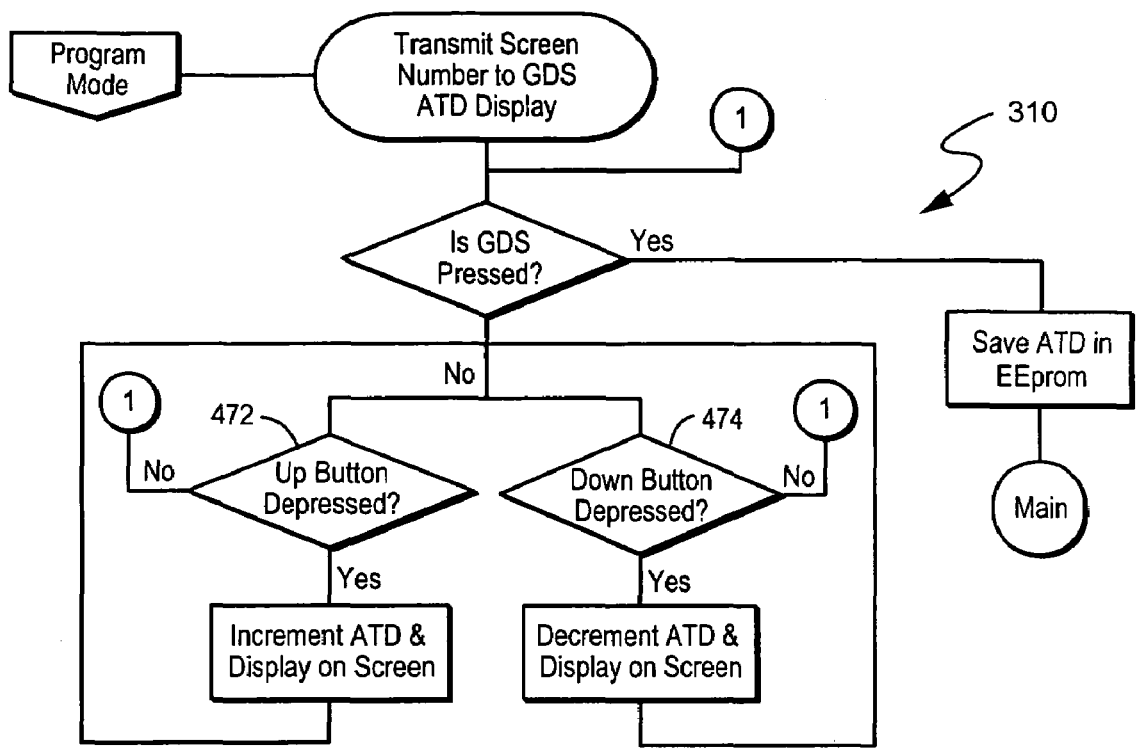
FIG. 10 is an exemplary illustrative non-limiting program mode software routine flowchart.

FIG. 8 is a flowchart of an exemplary illustrative non-limiting implementation of a software-controlled automatic dispensing mode. In the exemplary embodiment, after calibration and before automatic dispensing, the user may wish to program in a variable quantity to be dispensed repetitively in the automatic mode. This program mode 310 is shown in FIG. 8 and is illustrated in more detail in FIG. 10, but it may be bypassed if a previously programmed or preset quantity is being used. In the exemplary illustrative implementation, system 50 retains previously-programmed quantities values and uses them at next power up until changed. To change the program quantity, the user will direct the display to change the amount to be dispensed. The display indicates the amount to be dispensed ("ATD") by reading the EPROM data that has the number stored. A default setting of 1.0 ml or other desired amount may be provided. System 50 looks at the "ATD" value and if the pipette size has been changed to a smaller pipette and the "ATD" is larger than the maximum amount of the pipette, the system will automatically change the ATD to the maximum amount. For example, if the original pipette size was 50 ml, the maximum ATD would be 50.0 ml. If the user changes the pipette size to 25 ml, the system will automatically change the ATD to 25.0 ml. These may be default settings that can be overridden. To override the defaults, the user changes the ATD by pressing the push buttons (FIG. 10, blocks 472, 474). As the buttons 106, 108 are depressed, the system increments or decrements a displayed ATD until a desired ATD is reached. In the exemplary illustrative implementation, as the button is depressed passed a threshold set in software, the system will increase the speed at which the numbers change. As the pushbutton is released and passes a threshold, the numbers revert back to change at a slower speed. If the up button 106 is depressed, the ATD increases in 0.1 ml increments in one exemplary illustrative non-limiting implementation. If the down button 108 is depressed, the ATD decreases in 0.1 ml increments in one exemplary illustrative non-limiting implementation. Although one implementation may be to increase and decrease in increments as stated, one exemplary illustrative non-limiting arrangement (in that operation mode) will not be incremental in nature, but more flow rate specific. The minimum ATD may be set to some desired level e.g., 1.0 ml. A "learning" mode based on actual fluid dispensation under user-control may also be used to program amount to be dispensed. The maximum ATD may be based on pipette size. In the exemplary illustrative non-limiting implementation shown, system 50 remains in the ATD program mode until the graphical display switch 70*d* is depressed. At that time, the ATD is stored in EPROM so that if the unit is shut off, it will automatically be returned to the settings that are stored in EPROM. The system then returns to the main menu.

Referring once again to FIG. 8, once the desired dispensing quantity has been programmed into system 50 (or if a default or previously programmed amount is to be used), the system reads that ATD value and displays it on a graphical display 70*d*. The user may be asked to confirm that this is amount to be dispensed by depressing the switch of the graphical display 70*d* (block 502). In the automatic mode, each time the down button 108 is depressed passed a certain threshold set in software, the system will dispense the programmed amount of liquid. The system will repetitively dispense the desired quantity in response to successive depressions of down button 108 until the liquid level is below a minimum level (e.g., 3 ml of column height for a 50 ml pipette). In the exemplary illustrative non-limiting implementation, the vacuum pump speed is based on the depression of the buttons 106, 108. Thus, in the automatic programmable dispensing operation illustrated, users are able to control the rate at which system 50 aspirates and dispenses. This may be useful in order to, for example, provide a desired degree of agitation. If during this operation, the system reads that the up button 106 is depressed (i.e., the user wants to refill the pipette), the system will turn on pump 58 for vacuum and will stay on until either the user releases the button or until the amount of pressure indicated by pressure sensor 68 specifies that the column height is greater than the pipette allowable amount. Alternatively, the auto mode may employ several dispensing speed presets.

In more detail, when the system 50 detects that the down button is depressed (FIG. 8, block 504), it checks to see if the pipette 52 is empty by reading the pipette-side pressure transducer 68 output to determine column height and comparing that determined column height to the calculated minimum column height (e.g., 3 ml) (FIG. 8, block 506). If the microprocessor 70 determines that the unit is empty based on the comparison, it displays an error message (block 508) that requests the user to fill the pipette and does not attempt to dispense any additional liquid. Once the user fills the pipette above the minimum amount (FIG. 8, blocks 510-518), system 50 automatically recognizes that the unit may now dispense the requested amount.

The pump turns on first for a predetermined time interval, followed by the valve opening once the pressure developed is constant. The pump remains on until after the valve is closed. The pump may run for a set time prior to value opening—e.g., 250 ms. Assuming the unit is not empty, system 50 then calculates the amount of valve opening time needed to dispense the desired programmed amount based on column height as indicated by the pressure sensor 68 and based upon the programmed amount (FIG. 8, block 520). This calculation is performed (and/or results are looked up from memory) based on a formula derived from a model. Once the time has been calculated, system 50 turns on pump 58 for pressure for that amount of time at a pump speed also derived from modeling (FIG. 8, block 522). Once the time has expired, microprocessor 70 turns off pump 58 (FIG. 8, block 524) and returns to await further depression of one of buttons 106, 108.

Figure 9A:
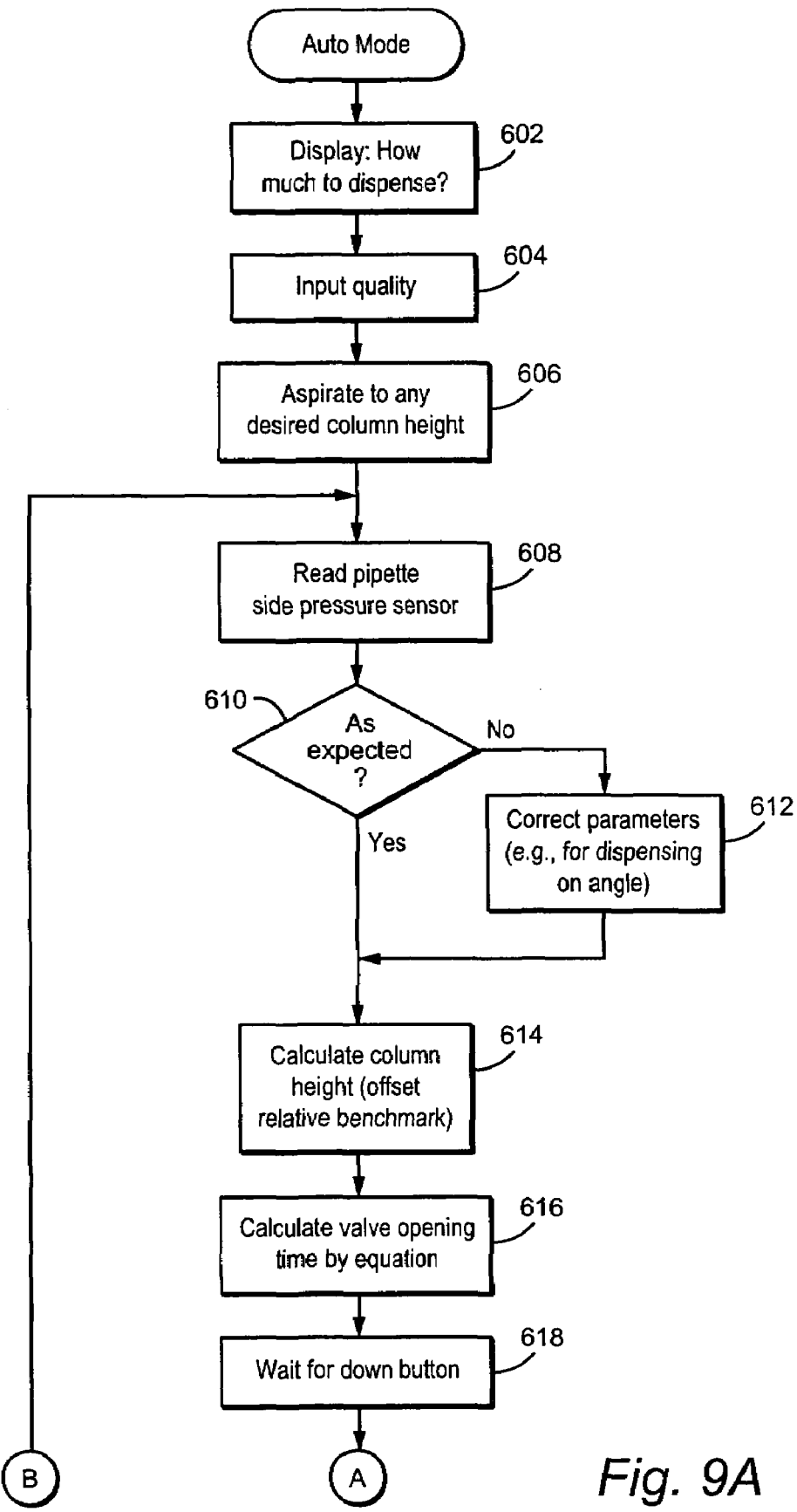
FIGS. 9A and 9B together are a flowchart of a more detailed exemplary non-limiting illustrative implementation of an auto dispensing mode.
Figure 9B:
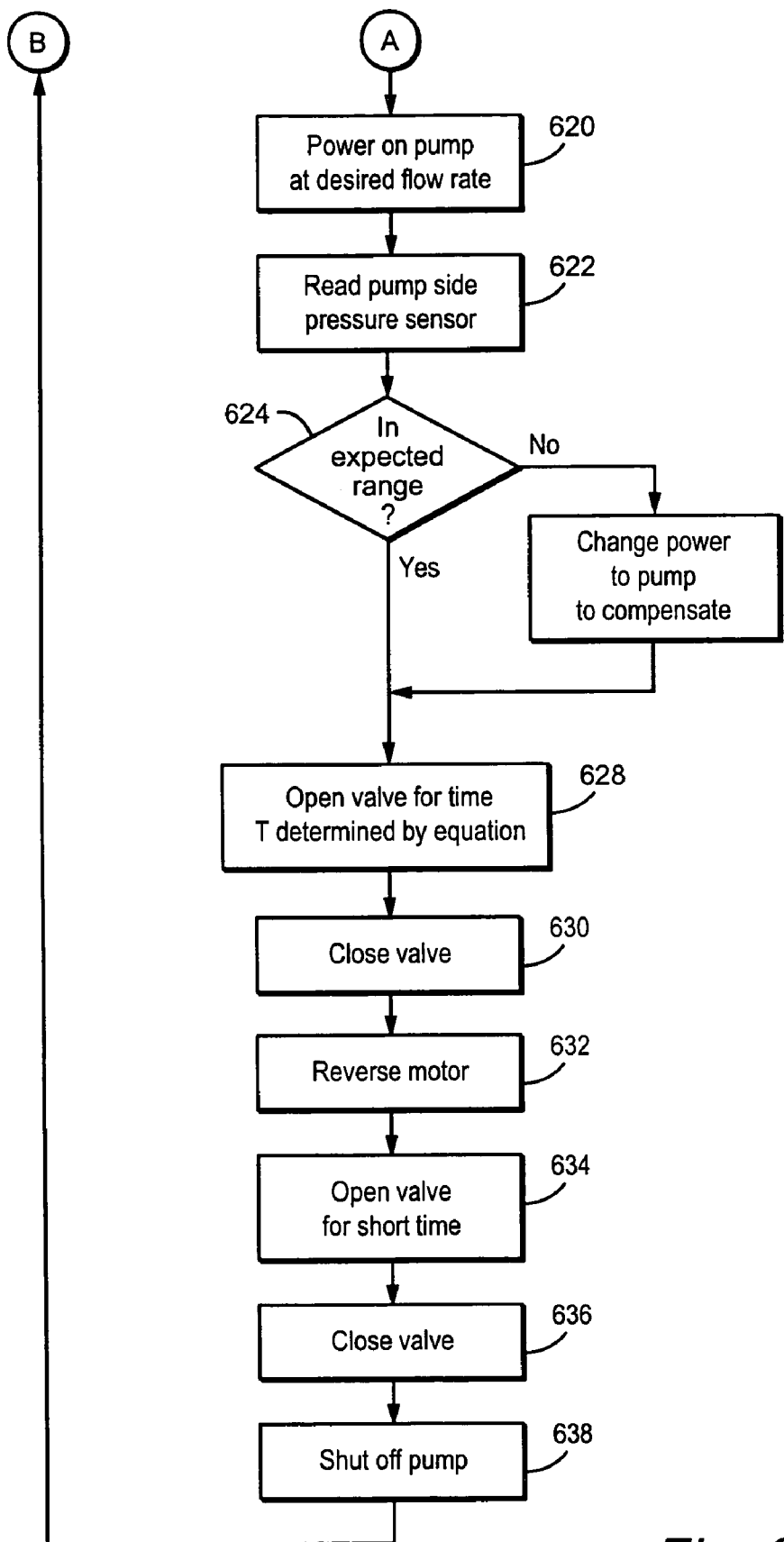

FIGS. 9A and 9B are a flowchart of a more detailed exemplary illustrative non-limiting implementation of automatic dispensing operation. In this example, system 50 displays a prompt to the user asking the user to specify what quantity of liquid to aspirate or may use a default (FIG. 9A, block 602). Upon ascertaining the quantity to dispense (FIG. 9A, block 604), the user then aspirates to any desired column height (FIG. 90A, block 606). At this point, microprocessor 70 reads the pipette-side pressure sensor 68 (block 608) and detects whether the pressure corresponds to an expected range (decision block 610). Assuming the read pressure value is as expected ("yes" exit to decision block 610), microprocessor 70 calculates or otherwise determines column height of the aspirated amount (e.g., based on the baseline values previously determined during calibration) (FIG. 9A, block 614). Microprocessor 70 then uses system modeling results to determine valve opening time (block 616) and waits for the user to depress down button 108 (block 618).

Although we could implement the use of absolute pressure sensing to establish to pump PWM, one exemplary non-limiting arrangement will likely not contain that feature. When the user depresses the down button, system 50 powers on pump 58 at a desired flow rate (block 620) and optionally reads the pump-side pressure sensor 66 to determine whether it is within an expected range (block 622, decision block 624). Pump output can change over time based on heating, wear, etc.; the test performed by decision block 624 gives system 50 a chance to correct pump output to compensate (block 626).

Microprocessor 70 then opens valve 60 for a time T that is determined based on system modeling (block 628). This valve opening at the desired pressure generated by pump 58 results in dispensing the programmed quantity of liquid. Upon expiration of the calculated valve opening time, microprocessor 70 closes valve 60 (block 630) to cease liquid dispensing. Note that in the exemplary illustrative non-limiting implementation, pump motor 58 remains active during the entire time that valve 60 is open—the pump starting before the valve opens (e.g., 250 ms before) and turning off after valve closure.

In one exemplary illustrative non-limiting arrangement, once microprocessor 70 closes valve 60 at the termination of the calculated valve opening time, the microprocessor may control pump 58 to reverse its direction in order to generate suction rather than positive pressure (block 632). Microprocessor 70 may then open valve 60 for a very short time (a few milliseconds) to prevent dripping and to decrease system settling time (block 634). Microprocessor 70 may then close valve 60 (block 636) and shut off pump 58 (block 638).

Example Illustrative Non-Limiting Non-Linear System Modeling

As discussed above, a non-linear system model is used in the exemplary illustrative non-limiting device 50 to provide accurate automatic dispensing of fluid quantities from pipette P. As the height of the fluid column in pipette P falls during dispensing, the amount of time the valve needs to open to dispense the same amount of liquid changes. In the exemplary illustrative implementation, column height is indirectly measured by measuring the vacuum at the top of the column and the top of the column is sealed. This vacuum pressure is used to determine how long the valve must be opened to dispense a given desired amount of liquid. The model used in the exemplary illustrative non-limiting implementation takes into account and models the non-linearity in the relationship between column height vacuum pressure and valve opening time.

Before reaching the model, some background discussion about "accuracy" and "precision" in pipetting are in order.

Accuracy

A pipette is accurate to the degree that the volume delivered is equal to the specified volume. Accuracy is expressed as the mean and standard deviation for replicate measurement:

$$\overline{E}\% = \frac{\overline{V} - Vn}{Vn} \times 100,$$

where $\overline{E}\%$=Accuracy,
$\overline{V}$=Mean Volume, and
Vn=Nominal Volume.

Precision

Precision generally refers to the repeatability of the pipette sampling. Precision is expressed as the coefficient of variation (CV). System 50 modeling will greatly influence pipetting precision because of reduced dependency on laboratory practices (that are dependent upon human intervention, manual dexterity and eye-hand coordination):

$$S = \sqrt{\frac{\sum_{n=1}^{n} (w_s - \overline{w})^2}{n-1}},$$

where S=Standard Deviation,
$W_s$=Individual Weighting
$\overline{W}$=Mean Weighting and
n=Number of measurements.

This equation can be expressed as a coefficient of variation:

$$CV\% = \frac{S}{\overline{w} + e} \times 100$$

Empirical Data Collection & System Testing

An, expected physical response of the system was that the result of a given pressure applied to a standing column of liquid would be a direct function of both column height and time. For example, the greater the column height of liquid in the pipette, the less time (in milliseconds) it would take to dispense a specific volume if the delivered pump pressure and valve aperture remained constant. In order to determine the non-linear nature of the system response, we empirically modeled several characteristics:

1) Dispensed Volume as a function of liquid Column Height
2) Dispensed Volume as a function of Pump Pressure
3) Dispensed Volume as a function of Valve Aperture
4) Dispensed Volume as a function of Time
5) Dispensed Volume as a function of Fluid Viscosity.

By constraining the dispensing pressure developed by the pump to a constant mid-range value during empirical data collection of the system (e.g., the pump PWM constrained to 175 bits; 255 bits being OFF and 1 bit being full ON), the variability of the pump speed could be used to slightly compensate for system variations during actual deployment, as well as compensate for its own wear (or thermal pressure delta over operating time). The nominal pump PWM value determined for the 50.0 ml pipette was 175 in one exemplary non-limiting illustrative implementation. Empirical modeling can use this pump setting as the "standard" programmed value, although any pump setting can be effectively modeled.

Once an effective method for closing the valve after a dispensing cycle is in place, the 50.0 ml pipette and system can be empirically modeled as follows:

1) Liquid is aspirated to predetermined column heights and dispensed at varying time intervals. The dispensing cycle begins with the valve closed and the system pressure stable. The pump is then energized to a predetermined power level (e.g., always 175) and monitored for consistent pressure (e.g., delivery for a predetermined time period such as 250 milliseconds), at which time the valve is completely opened (e.g., bit count 255), with a predictable reaction (lag) time approximately 15 milliseconds according to manufacturer's specifications. The valve then remains open for a preset period of time (measured in milliseconds) while the pressure displaced a given volume of liquid into a beaker. The valve is then abruptly turned OFF, and the reversing algorithm discussed above and shown in FIG. 9B is activated (or not).

2) The dispensed liquid is measured with a precision scale and tared after each measurement. An equivalency of 1.00 gram per 1.00 milliliter may, for example, be established for the purpose of scaling the quantities as closely as possible (Note: this is a directly scaleable quantity, and can be offset operationally in production or during calibration without difficulty).

3) For each preprogrammed volume to be dispensed, presets such as 50.0, 40.0, 30.0, 20.0, and 10.0 milliliter column heights can be used for benchmarking. Using algebraic equivalencies, the time (in milliseconds) can be determined that precisely dispenses the preprogrammed amount. In one example illustrative non-limiting implementation, the empirical measurement margin for error acceptable (as a function of weight displacement after measurement) during this benchmarking is 1.0% for 1.0 and 2.0 ml amounts, and decreases as the volume dispensed increased (10.0 ml displacements can for example be constrained to 0.04% of the preprogrammed amount for the empirical data to be considered valid and recorded). The amounts preprogrammed and benchmarked can for example be at intervals such as 1.0, 2.0, 3.0, 4.0, 5.0, 6.0, 7.0, 8.0, 9.0, and 10.0 milliliters.

4) The empirical data can be gathered in for example 1.0 ml column height increments from 50.0 down to 6.0 ml (45 measurements). All other measurements may be sampled at the intervals cited in the section above. See the following table:

Empirical Data Analysis

Exemplary actual 1.0 ml empirical data is as follows:

| XY | * | X Value | Y Value |
|---|---|---|---|
| 1 | | 6.0000000 | 291.00000 |
| 2 | | 7.0000000 | 286.00000 |
| 3 | | 8.0000000 | 281.00000 |
| 4 | | 9.0000000 | 276.00000 |
| 5 | | 10.000000 | 271.00000 |
| 6 | | 11.000000 | 265.00000 |
| 7 | | 12.000000 | 260.00000 |
| 8 | | 13.000000 | 256.00000 |
| 9 | | 14.000000 | 252.00000 |
| 10 | | 15.000000 | 247.00000 |

-continued

| XY | * | X Value | Y Value |
|---|---|---|---|
| 11 |  | 16.000000 | 243.00000 |
| 12 |  | 17.000000 | 240.00000 |
| 13 |  | 18.000000 | 236.00000 |
| 14 |  | 19.000000 | 233.00000 |
| 15 |  | 20.000000 | 229.00000 |
| 16 |  | 21.000000 | 224.00000 |
| 17 |  | 22.000000 | 221.00000 |
| 18 |  | 23.000000 | 218.00000 |
| 19 |  | 24.000000 | 215.00000 |
| 20 |  | 25.000000 | 212.00000 |
| 21 |  | 26.000000 | 209.00000 |
| 22 |  | 27.000000 | 207.00000 |
| 23 |  | 28.000000 | 204.00000 |
| 24 |  | 29.000000 | 201.00000 |
| 25 |  | 30.000000 | 198.00000 |
| 26 |  | 31.000000 | 195.00000 |
| 27 |  | 32.000000 | 193.00000 |
| 28 |  | 33.000000 | 192.00000 |
| 29 |  | 34.000000 | 189.00000 |
| 30 |  | 35.000000 | 186.00000 |
| 31 |  | 36.000000 | 184.00000 |
| 32 |  | 37.000000 | 182.00000 |
| 33 |  | 38.000000 | 180.00000 |
| 34 |  | 39.000000 | 177.00000 |
| 35 |  | 40.000000 | 175.00000 |
| 36 |  | 41.000000 | 173.00000 |
| 37 |  | 42.000000 | 171.00000 |
| 38 |  | 43.000000 | 170.00000 |
| 39 |  | 44.000000 | 167.00000 |
| 40 |  | 45.000000 | 164.00000 |
| 41 |  | 46.000000 | 163.00000 |
| 42 |  | 47.000000 | 161.00000 |
| 43 |  | 48.000000 | 160.00000 |
| 44 |  | 49.000000 | 159.00000 |
| 45 |  | 50.000000 | 158.88888 | where

XY=Displacement Cycle,

X=Column Height value prior to the displacement cycle, and

Y=Dispense Time (ms) required to displace 1.0 ml from the given Column Height (X reference).

It should be noted that whole number dispensing volumes from pre-selected pipette graduations were only used for the purpose of data clarity in this example. In general, the empirical data set can be derived from any manner of volume displacement and pipette column height, understanding that it is only a matter of mathematical presentation (variation in formulae) that would change.

Figure 12:
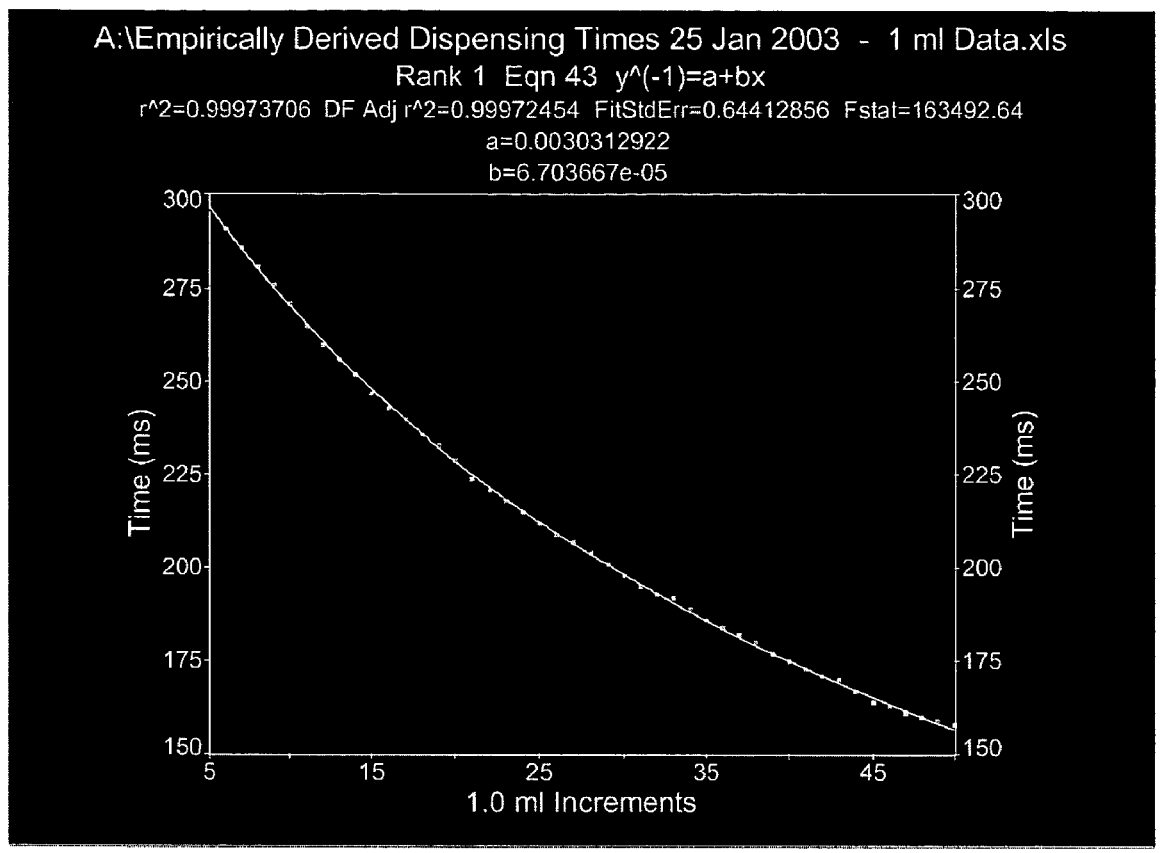
FIGS. 12-14 are graphical illustrations of exemplary non-limiting illustrative system modeling parameters.

FIG. 12 shows one exemplary illustrative non-limiting empirically derived dispensing times derived by equation based on such modeling procedure.

The FIG. 12 exemplary plot also contains the curve-fit equation of:

$$y-1=+bx$$

where y=Time (in milliseconds) to dispense the preprogrammed amount (each equation is different as a function of amount to be dispensed), x=Column Height (the starting Column Height of the dispensing cycle)

a=a constant determined by the empirical data, and b=a constant determined by the empirical data.

Note that it is desirable to take the inverse function of "y" for the Time to be ascertained. The equation can then be rewritten as:

$$y=1/(a+bx)$$

The following data is exemplary "A" and "B" constants from the curve-above fit analysis of the equation for the 1.0 through 10.0 ml data:

| Volume (ml) | A Constants | B Constants |
|---|---|---|
| 1 | 0.003031292 | 6.70367000E−05 |
| 2 | 0.001500689 | 3.07417000E−05 |
| 3 | 0.000970459 | 2.03847000E−05 |
| 4 | 0.000706635 | 1.53658000E−05 |
| 5 | 0.000577874 | 1.16246000E−05 |
| 6 | 0.000462246 | 1.00846000E−05 |
| 7 | 0.000393395 | 8.55889000E−06 |
| 8 | 0.000338824 | 7.49410000E−06 |
| 9 | 0.000295163 | 6.68268000E−06 |
| 10 | 0.000263529 | 5.96896000E−06 |

Using only the equations which result from plugging in the "A" and "B" constants might possibly limit the pipetter 50 to whole ml volume dispensing, with a decreased accuracy and precision due to liquid column heights that are not absolute whole number increments. Therefore, in an attempt to further mathematically map the system as a single equation, the "A" and "B" constants are both analyzed in the same way the XY empirical data was evaluated, as a function of dispensing volume.

Figure 13:
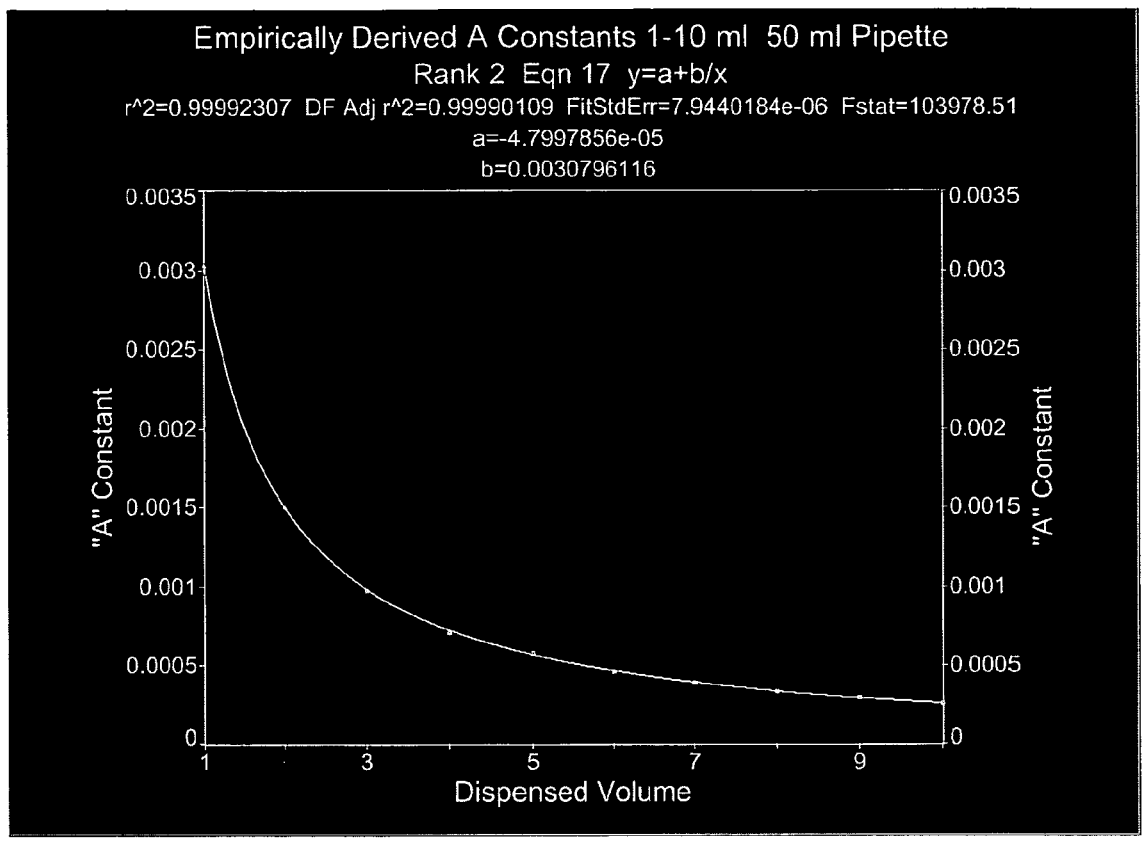
Figure 14:
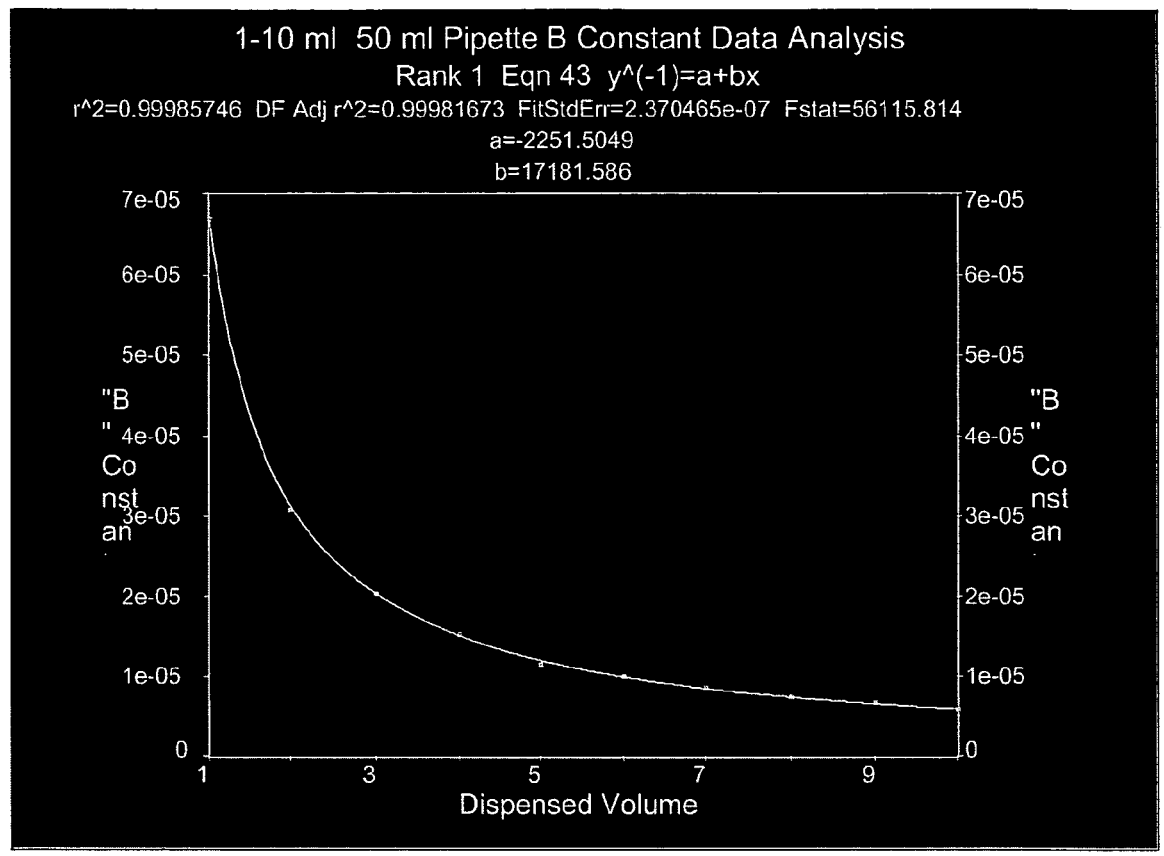

The exemplary illustrative graphs of FIGS. 13 and 14 are curve-fit plots of the "A" and "B" constants, respectively. The exemplary A constants curve-fit take the form of:

$$y=a+b/x$$

where a=−4.7998E−05, b=0.003079612, and x=Amount To be Dispensed.

The exemplary B constant takes the familiar curve-fit form of:

$$y=1/(a+bx)$$

where a=−2251.50489, b=17181.58587, and x=Amount To be Dispensed.

Rewriting both of the above equations for clarity yields:

$$A=-4.7998E-05+(0.003079612/AMT)$$

and $$B=1/(-2251.50489+(17181.58587*AMT))$$

Where AMT=Amount To be Dispensed (both equations).

Recalling the curve-fit equation where the result was the Time (ms) required to dispense a given volume from a known Column Height:

$$y=1/(a+bx)$$

and rewritten for clarity as follows:

$$\text{Time}=1/((-4.7998E-05+(0.003079612/AMT))+((1/(-2251.50489+(17181.58587*AMT)))*CH))$$

where

Time=Time in milliseconds required to dispense the AMT preprogrammed

CH=liquid Column Height

AMT=Amount To be Dispensed.

Perhaps the simplest equation to mathematically develop for inexpensive microcontrollers that will provide the greatest accuracy for system 50 with a 50.0 milliliter pipette, and is similar in format to that which would be deployed for the 10.0 and 25.0 milliliter pipettes, while further being flexible enough to have scaleable capabilities with which to account for varying liquid viscosities, is as follows:

$$\text{Time} = 1/((-4.7998E{-}05 + (0.003079612/AMT)) + ((1/(-2251.50489 + (17181.58587 * AMT))) * CH))$$

Where

Time=Time in milliseconds required to dispense the AMT preprogrammed,

CH=liquid Column Height, and

AMT=Amount To be Dispensed.

After significant testing, the above equation has been effectively deployed such that from virtually any column height, any incremental volume of liquid can be precisely and accurately displaced (within the framework of the parameters earlier presented).

Figure 11:
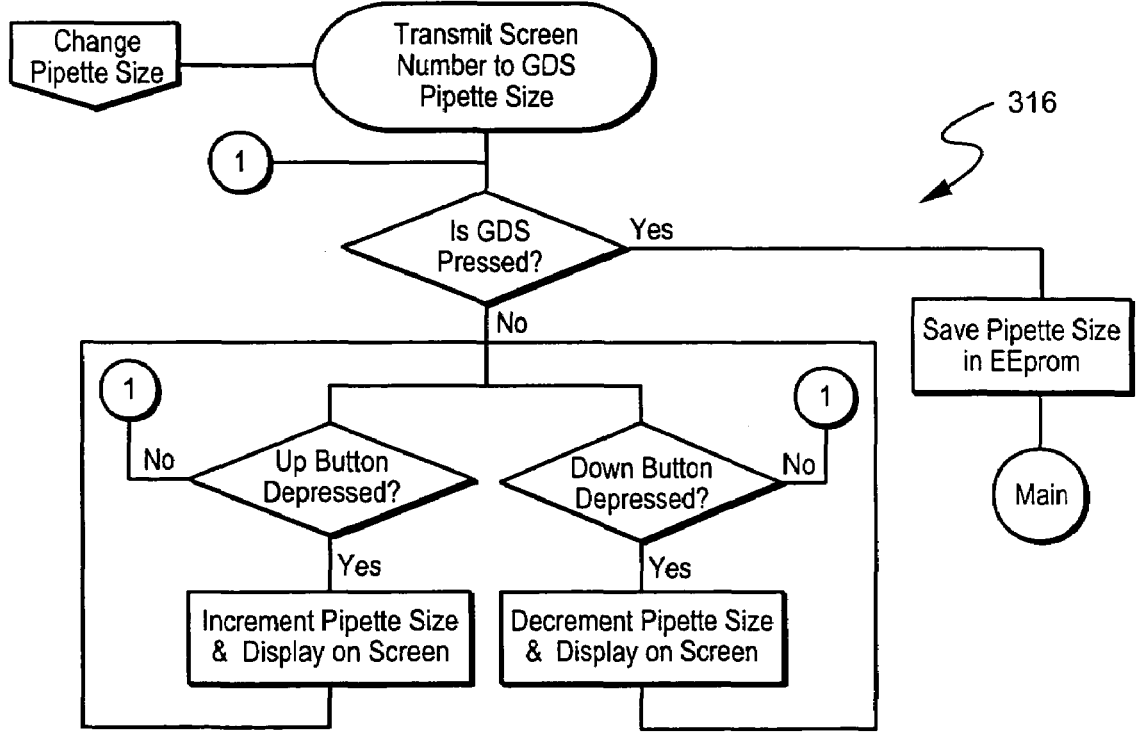
FIG. 11 is a flowchart of an exemplary illustrative non-limiting change pipette size software routine.

As will be understood, part of the modeling described above is based upon microprocessor 70 using prestored values and constants associated with a particular size pipette. System 50 in one exemplary illustrative non-limiting implementation may accommodate a variety of differently sized conventional or unconventional pipettes. In such exemplary illustrative non-limiting implementation, an operating mode 316 is provided to allow the user to program the pipette size. See FIG. 11. When the user presses this menu, system 50 allows the user to pick the pipette size he or she will be using. Exemplary size choices are 1 ml, 10 ml, 25 ml and 50 ml. The user picks the pipette size by using the up or down pushbuttons 106, 108. Pushing the up pushbutton increments the pipette size choice while pushing the down pushbutton decrements the pipette size choice. When the maximum or minimum pipette size is shown on the display screen 70d and the user presses the pushbutton, the system rolls over the choice. For example, the screen shows 1 ml, 10 ml, 25 ml, 50 ml, 1 ml, etc. if the up pushbutton is pressed, or 50 ml, 25 ml, 10 ml, 1 ml, 50 ml . . . if the down button is pressed. The system will remain in this mode until the graphical display switch button 70d is pressed. At that point, the pipette size is stored in the system EPROM and the system returns to the main menu.

Because the system is capable of being so accurate, in vertical dispensing applications it wouldn't be necessary to use pressure sensors as long as the starting column height was known or could be input by the user. If the starting column height is known, and because the dispensing is so accurate, subsequent column height measurements could be derived mathematically as opposed to an absolute pressure measurement. Summarily, all dispensing would be by equation alone for the entire column height.

Because the empirical modeling data points decrease as the valve open time increases, the ability to accurately model higher dispensing volumes is not as good as the multi-point data for smaller volumes. In order to improve the accuracy and precision of higher volume aliquots, an alternative method to a single valve open time would be as follows: (1) energize pump and allow constant pressure to stabilize; (2) open the valve for a time consistent for a smaller volume aliquot (i.e., 5 ml); (3) close the valve; continue to run the pump; recalculate the next dispensing quantity mathematically (or by use of the pressure sensors); (4) and open the valve for the ATD required; (5) repeat until the desired total volume aliquot has been dispensed.

There is a mathematical correlation between the various pipette sizes and column height. The relationship is linear, and is a function of cross-sectional volume. This permits calibration to be done on only one volume pipette while allowing any different subsequent volume pipette to used without further calibration. The only other consideration with respect to varying sizes of pipettes is the tapered dispensing tip of the pipettes, but this can be accommodated in firmware and is not an issue.

When the microcontroller has determined that the pipette is substantially empty (the pipette-side sensor has detected the low threshold for the given volume pipette), if the sensor is continuously monitored the microcontroller can determine when the tip of the pipette has been inserted into liquid (it can actually determine how far below the surface the tip has been inserted), and automatically aspirate to a predetermined column height. One obvious advantage would be the reduction of hand stress (a plus for those with carpal tunnel syndrome).

A math coprocessor may not be necessary, depending upon the microcontroller and/or programming language used.

While the technology herein has been described in connection with exemplary illustrative non-limiting implementations, the invention is not to be limited by the disclosure. For example, the technology herein can be applied to a wide variety of applications including fluid handling systems, foot control operation, tabletop designs, media bag reservoirs, etc. The invention is intended to be defined by the claims and to cover all corresponding and equivalent arrangements whether or not specifically disclosed herein.

We claim:

1. An electronic, hand held fluid dispensing system for use with a laboratory pipette, comprising:
   a housing capable of being held in one hand;
   a coupler disposed at least partially within said housing, said coupler being adapted to be removably connected to said pipette;
   a source of pressure and/or vacuum;
   a valve pneumatically coupled between said source and said coupler;
   at least one pressure transducer pneumatically coupled to said coupler, said pressure transducer generating at least one output; and
   an electronic controller electrically coupled to control at least said valve and also electrically coupled to said pressure transducer, said electronic controller operating in an open-loop mode to control said valve in accordance with a valve control timing parameter derived from said pressure transducer output and a stored quantity parameter relating to a desired quantity of fluid to be dispensed, said valve control timing parameter controlling said valve so that said system automatically, repetitively dispenses substantially a predetermined quantity of fluid from said pipette.

2. The system of claim 1 wherein said source comprises an electric air pump.

3. The system of claim 1 wherein said source comprises a source of atmospheric pressure.

4. The system of claim 1 wherein said source comprises a source of a pressurized gas.

5. The system of claim 1 wherein said source comprises a reversible electric pump that selectively generates suction and positive pressure, and wherein said electronic controller is coupled to selectively control said pump to generate suction to draw fluid into said pipette.

6. The system as in 1 wherein said hand-held housing is gun-shaped.

7. The system as in 1 wherein said electronic controller dynamically calculates said valve control parameter based on a non-linear mathematical model.

8. The system as in 1 wherein said electronic controller uses a look-up table to ascertain said valve control parameter based in part on measured pressure.

9. The system as in 1 where further including a further pressure transducer that measures pressure between said source and said valve, and wherein said electronic controller is responsive to said second pressure transducer for controlling said source to compensate for variations in the output pressure of said source.

10. The system as in 1 wherein said coupler is adapted to accept pipettes of different sizes.

11. The system as in 1 further including a graphical display disposed on said housing and coupled to said electronic controller.

12. The system as in 1 further including means for allowing an end user to program said desired quantity.

13. The system as in 12 wherein said means comprises first and second push buttons mounted on said housing, said first and second push buttons in one mode of operation being used to program said desired quantity, and in a further mode of operation being used to control aspiration and dispensing rate.

14. The system as in 12 wherein said means comprises software executed by said electronic controller that allows said electronic controller to learn said desired quantity based on user operation of said system.

15. The system as in 1 wherein said system achieves repeatable dispensing accuracies of better than 1%.

16. The system as in 1 wherein said fluid control element comprises an electronic valve with a on/off orifice, and wherein said control parameter controls the duration of opening of said valve orifice.

17. The system as in 1 wherein said fluid control element comprises a valve with a variable orifice, and wherein said control parameter controls the amount said valve orifice is opened.

18. The system as in 1 wherein said electronic controller controls said source to reduce undesired dripping of fluid from said pipette.

19. The system as in 1 wherein said electronic controller derives an indication of the angle of said pipette from vertical.

20. The system as in 1 wherein said electronic controller compensates for different fluid viscosities.

* * * * *